US010712880B2

(12) United States Patent
Leigh et al.

(10) Patent No.: US 10,712,880 B2
(45) Date of Patent: Jul. 14, 2020

(54) SIGNAL INFUSION TO ENHANCE APPENDAGE DETECTION AND CHARACTERIZATION

(71) Applicant: Tactual Labs Co., New York, NY (US)

(72) Inventors: Darren Leigh, Round Hill, VA (US); Clifton Forlines, South Portland, ME (US); Braon Moseley, Round Rock, TX (US); Robert Alack, Jr., Austin, TX (US)

(73) Assignee: Tactual Labs Co., New York, NY (US)

( * ) Notice: Subject to any disclaimer, the term of this patent is extended or adjusted under 35 U.S.C. 154(b) by 139 days.

(21) Appl. No.: 15/821,448

(22) Filed: Nov. 22, 2017

(65) Prior Publication Data

US 2018/0173341 A1 Jun. 21, 2018

Related U.S. Application Data

(63) Continuation-in-part of application No. 15/690,242, filed on Aug. 29, 2017, now Pat. No. 10,503,331, and a continuation-in-part of application No. 15/690,234, filed on Aug. 29, 2017, now Pat. No. 10,386,975.

(60) Provisional application No. 62/381,314, filed on Aug. 30, 2016, provisional application No. 62/428,862, filed on Dec. 1, 2016, provisional application No. 62/488,753, filed on Apr. 22, 2017, provisional application No. 62/588,267, filed on Nov. 17, 2017.

(51) Int. Cl.
*G06F 3/044* (2006.01)
*G06F 3/01* (2006.01)
*G06F 3/041* (2006.01)

(52) U.S. Cl.
CPC .............. *G06F 3/044* (2013.01); *G06F 3/014* (2013.01); *G06F 3/0416* (2013.01); *G06F 2203/04102* (2013.01); *G06F 2203/04111* (2013.01)

(58) Field of Classification Search
CPC ....................................... G06F 3/044
USPC ............ 345/1.3, 8, 157, 163, 173, 174, 440; 455/565.1; 361/679.03
See application file for complete search history.

(56) References Cited

U.S. PATENT DOCUMENTS 5,367,631 A * 11/1994 Levy .................... G06F 3/03543
345/163
8,890,773 B1 * 11/2014 Pederson ............... H04B 1/385
345/8

(Continued)

*Primary Examiner* — Prabodh M Dharia
(74) *Attorney, Agent, or Firm* — Adam Landa

(57) ABSTRACT

An infusion system including two infusors is operatively connected to a source of infusion signals. In an embodiment, the infusors being adapted for attachment to different parts of the same hand of a user. In an embodiment, the infusors are embedded in a glove or other wearable component. In an embodiment, a choke is used to mitigate infusion signals in other parts of a body. The infusion signal source is configured to transmit differing, orthogonal signals to the two infusors. In an embodiment, each of the differing signals is made up of at least a high frequency signal and a low frequency signal. In an embodiment, the high frequency signal and the low frequency signal are at least one octave apart and orthogonal to each other. In an embodiment, the infusion system includes a steering wheel sensor made from a plurality of conductors attached to a receiver.

4 Claims, 13 Drawing Sheets

(56) References Cited

U.S. PATENT DOCUMENTS

| | | | | |
|---|---|---|---|---|
| 9,008,340 B2* | 4/2015 | Ku | ............... | A61B 5/04845 |
| | | | | 381/317 |
| 2003/0214481 A1* | 11/2003 | Xiong | ............... | G06F 3/017 |
| | | | | 345/157 |
| 2004/0162491 A1* | 8/2004 | Pfister | ............... | A61B 5/0059 |
| | | | | 600/476 |
| 2009/0189617 A1* | 7/2009 | Burns | ............... | E21B 43/24 |
| | | | | 324/649 |
| 2013/0076594 A1* | 3/2013 | Sirpal | ............... | G06F 3/0488 |
| | | | | 345/1.3 |
| 2013/0303827 A1* | 11/2013 | Feng | ............... | A61N 2/006 |
| | | | | 600/9 |
| 2014/0298450 A1* | 10/2014 | Lymberopoulos | ... | G06F 1/1684 |
| | | | | 726/19 |
| 2014/0378191 A1* | 12/2014 | Hosoi | ............... | H04M 1/6066 |
| | | | | 455/575.1 |
| 2015/0256927 A1* | 9/2015 | Wood | ............... | H04R 3/00 |
| | | | | 363/126 |
| 2015/0309535 A1* | 10/2015 | Connor | ............... | G06F 1/163 |
| | | | | 361/679.03 |
| 2016/0078657 A1* | 3/2016 | McCord | ............... | G06T 11/206 |
| | | | | 345/440 |
| 2016/0103648 A1* | 4/2016 | Reeves | ............... | G06F 1/1616 |
| | | | | 345/173 |
| 2017/0038839 A1* | 2/2017 | Seth | ............... | G06F 3/017 |
| 2017/0055606 A1* | 3/2017 | Xu | ............... | A41D 19/0027 |
| 2018/0013499 A9* | 1/2018 | Bandy | ............... | A61B 1/00016 |
| 2018/0164921 A1* | 6/2018 | Leigh | ............... | A63F 13/214 |
| 2018/0267653 A1* | 9/2018 | Holman | ............... | G06F 3/014 |
| 2018/0364840 A1* | 12/2018 | Alack, Jr. | ............... | G06F 3/017 |
| 2019/0018534 A1* | 1/2019 | Holman | ............... | G06F 3/0418 |
| 2019/0046089 A1* | 2/2019 | Pislak | ............... | A61B 5/12 |
| 2019/0087028 A1* | 3/2019 | Gritti | ............... | G06F 3/0416 |
| 2019/0227624 A1* | 7/2019 | Holman | ............... | G01S 1/00 |
| 2019/0227625 A1* | 7/2019 | Holman | ............... | G06F 3/014 |
| 2019/0227664 A1* | 7/2019 | Holman | ............... | G01D 5/252 |
| 2019/0227665 A1* | 7/2019 | Holman | ............... | G06F 3/014 |

* cited by examiner

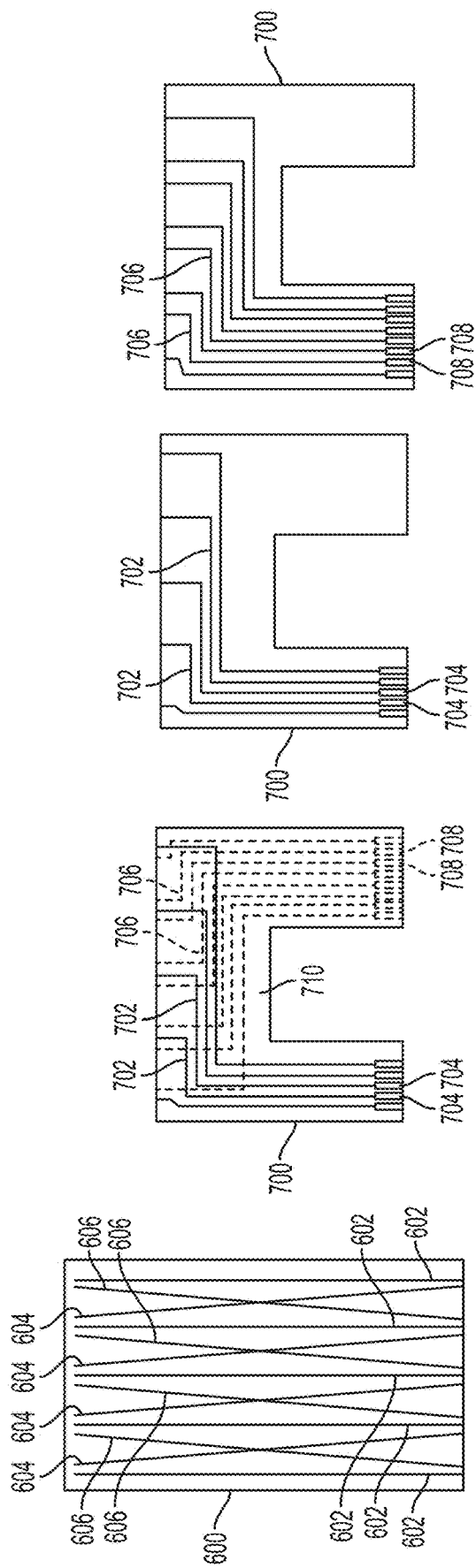

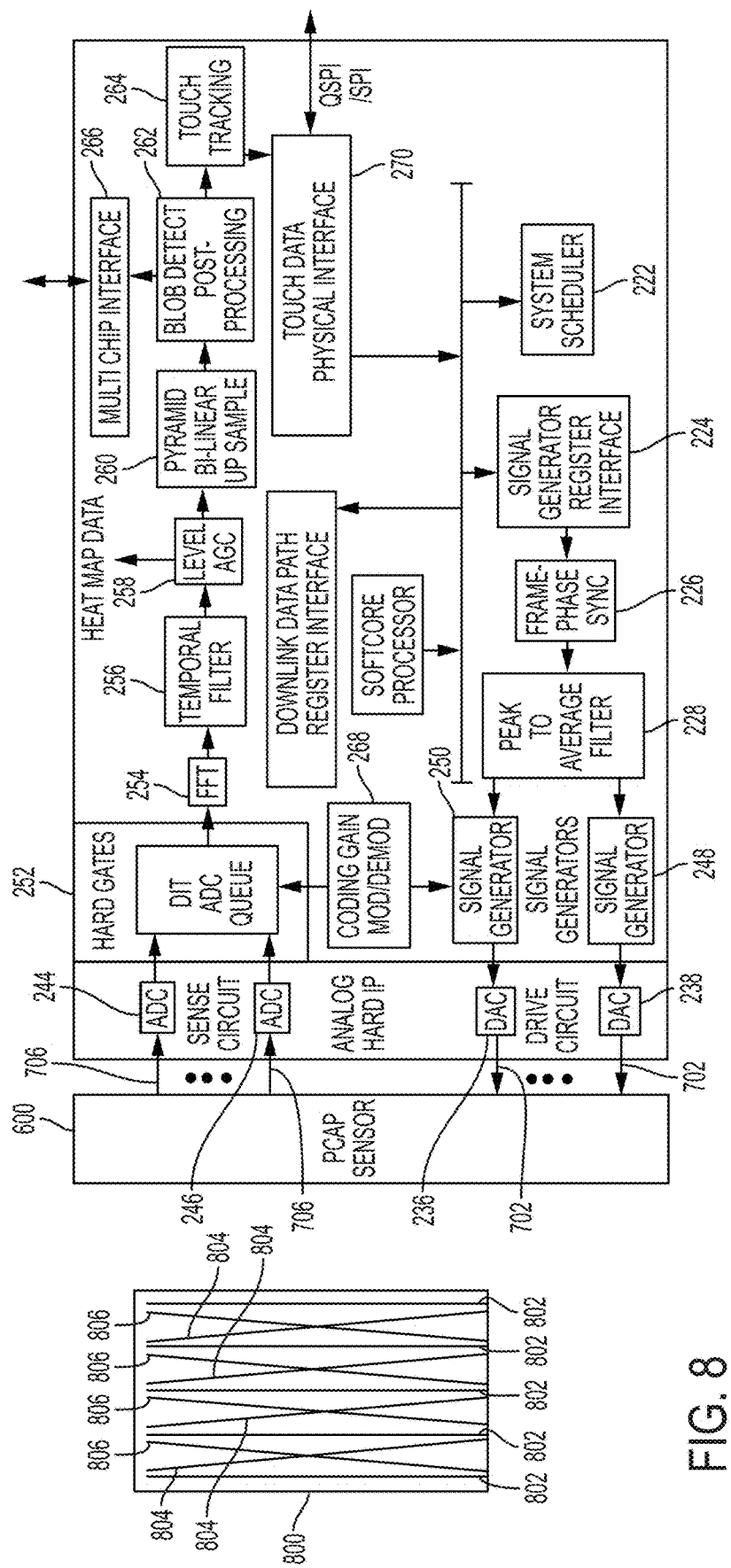

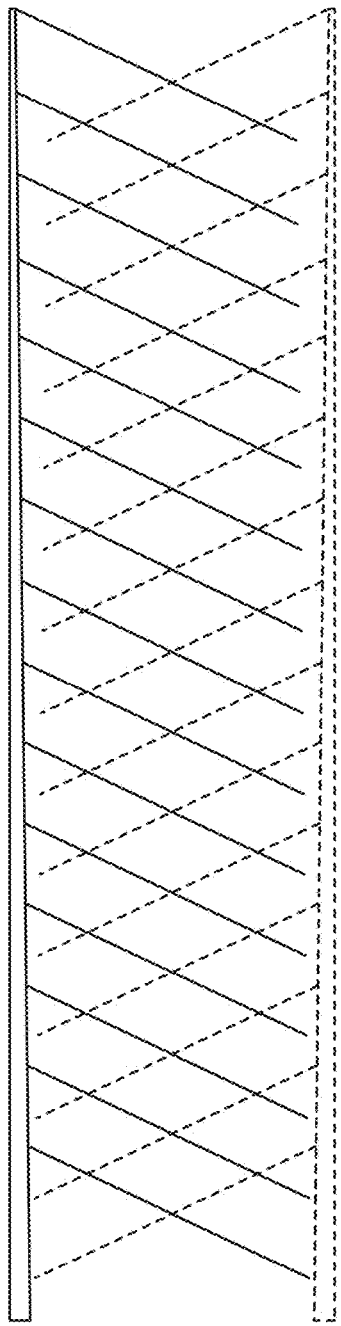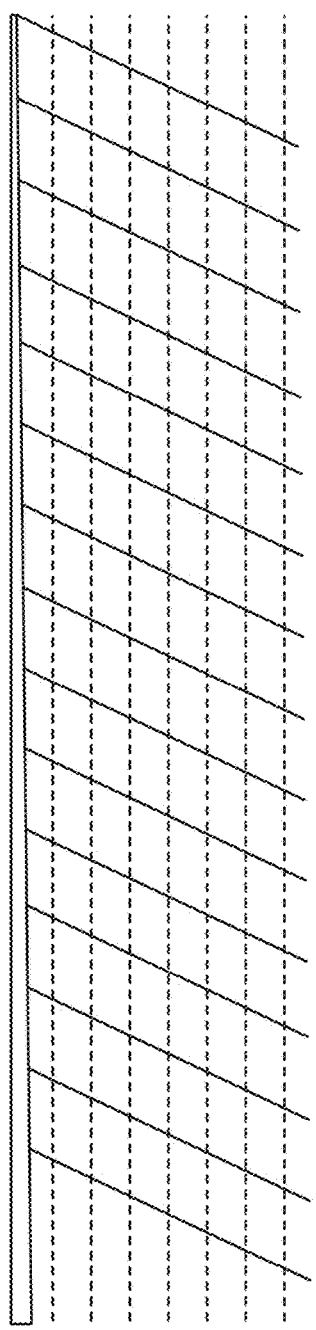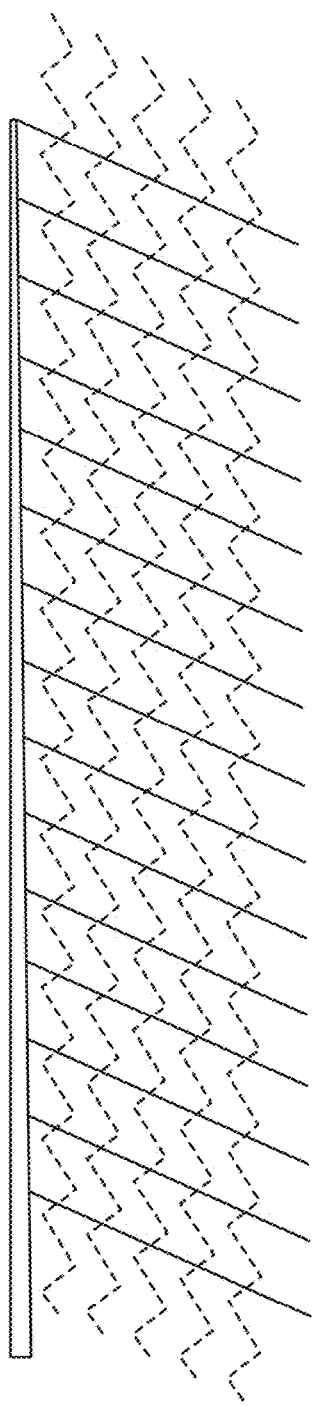

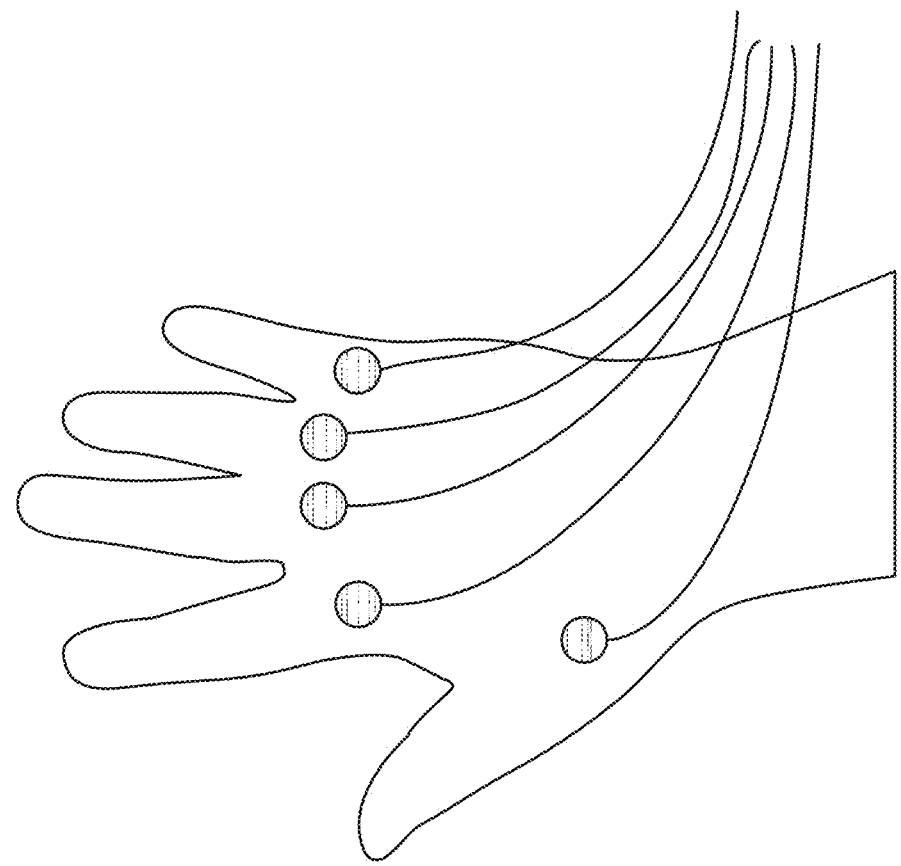
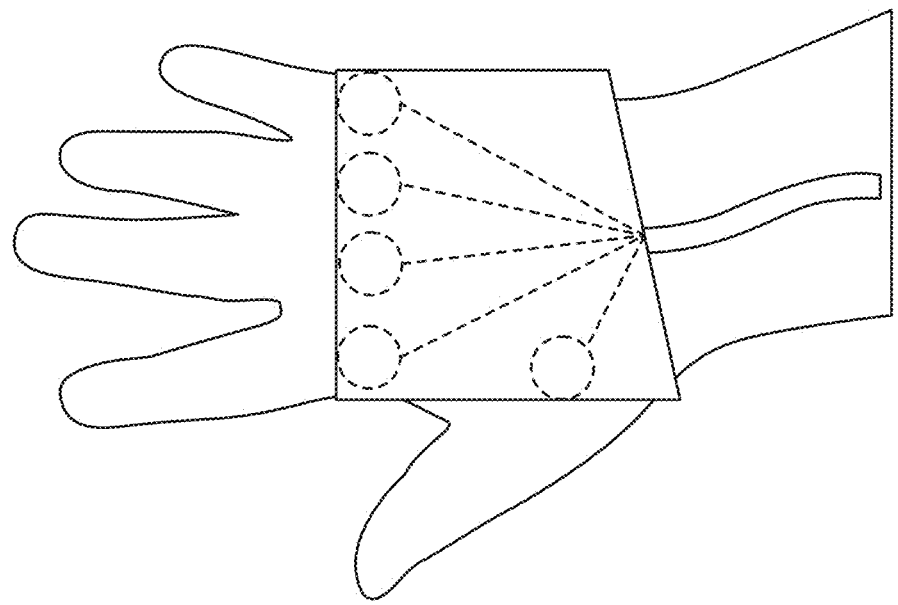

SIGNAL INFUSION TO ENHANCE APPENDAGE DETECTION AND CHARACTERIZATION

This application is a continuation-in-part of and claims priority to U.S. patent application Ser. No. 15/690,242 entitled SINGLE SIDED CAPACITIVE SENSOR, filed on Aug. 29, 2017, and Ser. No. 15/692,234 entitled CAPACITIVE SENSOR, also filed on Aug. 29, 2017, and each of those claiming priority to U.S. Patent Application No. 62/381,314 which was filed on Aug. 30, 2016.

This application is also a continuation-in-part of and claims priority to U.S. Provisional Patent Application No. 62/428,862, filed Dec. 1, 2016 and entitled SIGNAL INJECTION TO ENHANCE APPENDAGE DETECTION AND CHARACTERIZATION.

This application is also claims priority to U.S. Provisional Patent Application No. 62/488,753, filed Apr. 22, 2017 and entitled HETEROGENEOUS SENSING APPARATUS AND METHODS, and U.S. Provisional Patent Application No. 62/588,267, filed Nov. 17, 2017 and entitled SENSING CONTROLLER, each of which are incorporated herein by this reference as if they had been set forth fully herein.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The disclosed systems and methods relate in general to the field of sensing, and in particular to an infusion system and method to enhance appendage detection and characterization.

BRIEF SUMMARY OF THE INVENTION

It is an object of this disclosure to provide a signal infusion system and method to enhance appendage detection and characterization.

It is another object of this disclosure to provide a signal infusion system and method that employs two or more infusor points, each infusing multiple frequencies.

It is a further object of this disclosure to provide a signal infusion system and method that employs a choke to mitigate the effects of infused signals in undesired areas.

It is yet a further object of this disclosure to provide infusion system and method that can be used to enhance appendage detection and characterization on a touch sensitive a steering wheel.

It is also a further object of this disclosure to provide an infusion system and method that can be used with a touch sensor for a steering wheel.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

FIG. 6 shows a schematic illustration of another embodiment of a sensor for detecting touch.

FIG. 7A shows an example of a connector, (showing one layer in phantom) that may be employed in in connection with the sensor for detecting touch illustrated in FIG. 6.

FIGS. 7B and 7C show a front and rear view of the connector illustrated in FIG. 7A.

FIG. 8 shows a schematic illustration of yet another embodiment of a sensor for detecting touch.

FIG. 9 shows a functional block diagram of an illustrative frequency division modulated touch sensitive device.

FIGS. 12A-12E each show illustration of various embodiments of a sensor pattern that may be advantageous for use in connection with portions of a complex shape such as a toroid.

FIG. 15 is a schematic illustration of one embodiment of a signal injection system for a hand.

FIG. 16 is a schematic illustration of another embodiment of the signal injection system shown in FIG. 15.

DETAILED DESCRIPTION

The present application contemplates various embodiments of touch sensors designed for human-computer or human-machine interaction applications. The present application also contemplates various configurations and orientations of touch sensor conductors to sense human-computer or human-machine interaction when combined with touch sensing apparatus. While the touch sensor conductor configurations are suited to use with frequency-orthogonal signaling techniques (see, e.g., U.S. Pat. Nos. 9,019,224 and 9,529,476, and U.S. patent application Ser. No. 14/216,791), it may be used with other signal techniques including scanning or time division techniques, and/or code division techniques. It is pertinent to note that the sensors described and illustrated herein are also suitable for use in connection with signal infusion (a/k/a signal injection) techniques and apparatus.

Figure 1:
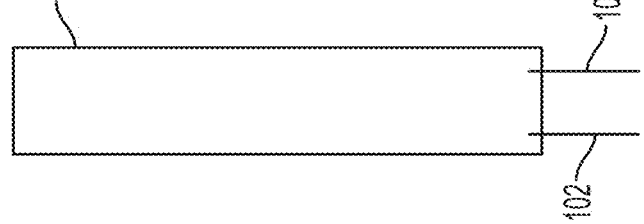
FIG. 1 shows a high-level illustration of an embodiment of a slide sensor.

FIG. 1 shows a high-level illustration of an embodiment of a slide sensor 100 made in accordance with the present invention. Slide sensor 100 comprises at least two touch sensor conductors 102, 104, one to act as a drive line and the other to act as a sense line. In an embodiment, touch sensor conductor 102 is employed as a drive line, and touch sensor conductor 104 is used as a sense line. In an embodiment, the reverse holds, and touch sensor conductor 102 is employed as a sense line, while touch sensor conductor 104 is used as a drive line. Regardless of that orientation, to operate the slide sensor 100, drive circuitry (not shown) generates a drive signal to stimulate the drive line, and a sensing circuit (not shown) senses a capacitively coupled response. A baseline response is sensed (by definition) when no touch is present on the surface of slide sensor 100. (As discussed above, the term touch, as used herein, does not require contact, but rather, refers to contact and near touches that affect the capacitive coupling between a drive line and a sense line.) When a touch occurs, a touch delta can be identified. In other words, when the touch occurs the capacitive coupling between a drive line and a sense line changes. In an embodiment, the touch delta is positive. In an embodiment, the touch delta is negative, The touch delta of the slide sensor 100 differs depending on the location along the slide sensor 100 (i.e., from and away from the location where the touch sensor conductors are visible) of the touch object, i.e., the object affecting the capacitive coupling between the drive line and the sense line. (As used herein, the term touch object will be used to refer to the object affecting the capacitive coupling between the drive line and the sense line.) In an embodiment, the magnitude of the touch delta is different when a touch object is at one end of the slide sensor than it is when the same touch object is at the other end of the slide sensor. In an embodiment, the magnitude of the touch delta is greater when the touch object is at one end of the slide sensor and lower when it is at the other end of the slide sensor. In an embodiment, the magnitude of the touch delta changes from a high or maximum when the touch object is at one end of the slide sensor and a minimum or low when the touch object is at the other end of the slide sensor 100. In an embodiment, the touch delta changes as a touch object slides along the slide sensor 100 lengthwise (e.g., towards and away from the touch sensor conductor connections shown in FIG. 1). In an embodiment, the touch delta changes in a predictable manner as a touch object slides along the slide sensor 100 lengthwise. In an embodiment, because the touch delta changes with lengthwise position, the magnitude of the touch delta can be used to infer position.

Although the slide sensor 100 is shown having two touch sensor conductors accessible for connection at one end (i.e., edge) of the unit, it should be noted that in an embodiment, such access points (e.g., points of connection for drive and sense circuitry) may be placed on opposite ends of the slide sensor 100. In an embodiment, the access points may be made at any location on the slide sensor 100, however, as will be apparent to one of skill in the art in view of this disclosure, in routing leads to or from the touch sensor conductors, care needs to be taken to ensure that the routing does not cause interference with the sensor signal (e.g., with the sensed response). In an embodiment, shielding is used to prevent interference due to the location or position of routed leads used to connect a touch sensor conductor to a point where it can be accessed.

The touch sensor conductor configurations disclosed herein can be produced using any technique to place the touch sensor conductors upon a front and/or back surface or within a substrate. Techniques familiar to those of skill in the art can be used to place, configure or orient the touch sensor conductors, including, e.g., etching, photo-lithography, chemical vapor deposition, physical vapor deposition, chemical-mechanical planarization, or oxidation, to name several of common methods. Many different substrates are suitable for supporting touch sensor conductors. In an embodiment, a rigid or flexible printed-circuit board is used to support the touch sensor conductors. In an embodiment, flexible plastics or other deformable substrates can be used to support the touch sensor conductors.

Moreover, in each of the touch sensor conductor configurations disclosed herein, one or more of the touch sensor conductors may be placed on opposing sides of the supporting substrate from one or more of the other touch sensor conductors. Thus, in an embodiment, both touch sensor conductors may be on one side of a substrate. Alternatively, in an embodiment, one or more touch sensor conductors may be on one side of a substrate, while one or more other touch sensor conductors is on the opposing side of the substrate. In another embodiment, one or more of the touch sensor conductors are on one side of a relatively thin substrate, and one or more of the other touch sensor conductors are on a separate substrate, the two substrates being stacked with the relatively thin substrate above the other substrate. Other configurations will be recognized by persons of skill in the art in view of this disclosure without departing from the spirit and scope of the description herein, which is only intended to be limited by the annexed claims.

Figure 2:
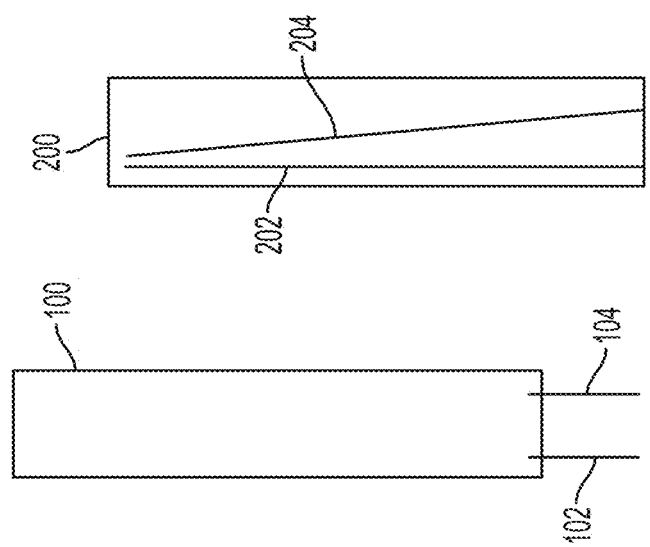
FIG. 2 shows a schematic illustration of one embodiment of a slide sensor.

FIG. 2 shows a schematic illustration of one embodiment of a slide sensor 200. In the illustration, touch sensor conductors 202, 204 are visible in the slide sensor 200. In the illustrated embodiment, the touch sensor conductors 202, 204 are not parallel to each other, but rather, are arranged in a manner that the relationship between them changes along the length of the slide sensor 200. In an embodiment, the touch sensor conductors 202, 204 are oriented such that any given linear position along the length of the slide sensor 200 (i.e., up and down on the illustrated figure) corresponds to a different distance between the touch sensor conductors 202, 204. In an embodiment, the touch sensor conductors 202, 204 are oriented such that any given linear position along the length of the slide sensor 200 corresponds to a different touch delta for a given touch object at that linear position. Although one touch sensor conductor 202 is shown as a straight line parallel to the lengthwise direction of the slide sensor 200, this orientation is not necessary or required. In an embodiment, touch sensor conductor 202 is not straight. In an embodiment, touch sensor conductor 202 is curved. In an embodiment, touch sensor conductor 202 is not oriented parallel to the lengthwise direction of the slide sensor 200. In an embodiment, the touch sensor conductors 202, 204 are oriented in a narrow "V" formation. In an embodiment, the touch sensor conductors 202, 204 are oriented in a narrow inverted "V" formation. In an embodiment both touch sensor conductors 202, 204 are curved, and are oriented such that any given linear position along the length of the slide sensor 200 corresponds to a different touch delta for a given touch object at that linear position.

In an embodiment, both touch sensor conductors 202, 204 are curved, and are oriented such that any given X, Y position on the touch surface of the slide sensor 200 corresponds to a different touch delta for a given touch object at that position. In an embodiment where both touch sensor conductors 202, 204 are curved, a first touch sensor conductor may be configured in a space-filling curve, (e.g., a Hilbert Curve) and another touch sensor is configured to have a continuously variable distance from the first curve along its length (e.g., starting very close, and ending further away). In an embodiment using two curved touch sensor conductors, a 1-dimensional measurement along the length of the first curve can be used to derive 2-dimensional measurements on the sensor. In an embodiment, the first curve could be any Peano curve. In an embodiment, the first curve could be a Gosper curve. In an embodiment, the first curve could be a Moore curve. In an embodiment, the first curve could be a Serpinski curve. It will be apparent to a person of skill in the art in view of this disclosure that with respect to a space-filling curve, there are convenient mathematics for moving between a 1-dimension position on the curve to a 2D position in the space that it is filling.

Although the slide sensor 200 is shown having two touch sensor conductors accessible for connection at one end (i.e., edge) of the unit, it should be noted that in an embodiment, such access points (e.g., points of connection for drive and sense circuitry) may be placed on opposite ends of the slide sensor 200. In an embodiment, the access points may be made at any location on the slide sensor 200, however, as will be apparent to one of skill in the art in view of this disclosure, in routing leads to or from the touch sensor conductors, care needs to be taken to ensure that the routing does not cause interference with the sensor signal (e.g., with the sensed response). In an embodiment, shielding is used to prevent interference due to the location or position of routed leads used to connect a touch sensor conductor to a point where it can be accessed.

It should be noted that sensing areas (and or substrates) may come in various shapes and sizes, thus, the "one edge" description may not apply as clearly to some cases. It will be apparent to one of skill in the art in view of this disclosure that due to the novel configuration of the sensors described herein, electrical access to the conductors can be made in substantially less than 180 degrees of a sensing area as measured from a centroid of the sensing area. This differs from a traditional row-column sensor that would require electrical access from almost an entire 180 degrees. In an embodiment, electrical access to the conductors can be made in less than 120 degrees of a sensing area as measured from a centroid of the sensing area. In an embodiment, electrical access to the conductors can be made in less than 90 degrees of a sensing area as measured from a centroid of the sensing area. In an embodiment, electrical access to the conductors can be made in less than 45 degrees of a sensing area as measured from a centroid of the sensing area.

Figure 3:
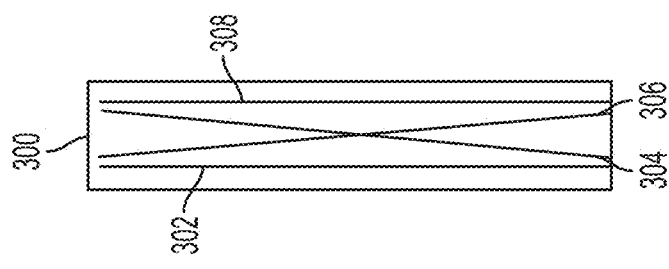
FIG. 3 shows a schematic illustration of another embodiment of a slide sensor.

FIG. 3 shows a schematic illustration of another embodiment of a slide sensor 300. Slide sensor 300 comprises a total of four touch sensor conductors 302, 304, 306, 308. In an embodiment, two of the four touch sensor conductors 302, 308 are used as drive lines while the other two 304, 306 are used as sense lines. The reverse is equally applicable. In an embodiment, a bridge is used to conductively separate the two crossing touch sensor conductors 304, 306 In an embodiment, the two crossing touch sensor conductors are on separate layers. In an embodiment, the two crossing touch sensor conductors are on the front and back of the same substrate. the two crossing touch sensor conductors are on separate substrates. The non-crossing touch sensor conductors 302, 308 may be, but need not be, on the same or different layers or on the same or different substrates. As discussed above, in an embodiment, the touch sensor conductors may be or include curves instead of being solely straight lines. In order to operate as part of a touch sensor, the touch sensor conductors are configured to permit drive or sense circuitry (not shown) to be attached thereto.

In the embodiment shown in FIG. 3, all of the touch sensor conductors can be accessed on a single edge of the slide sensor 300. This permits the slide sensor 300 to be used in applications providing very small bezel space on three of the four sides. Although the slide sensor 300 is shown having its touch sensor conductors accessible for connection at one end of the unit, it should be noted that in an embodiment, such access points (e.g., points of connection for drive and sense circuitry) may be placed on opposite ends of the slide sensor 300. In an embodiment, the access points may be made at any location on the slide sensor 300, however, as will be apparent to one of skill in the art in view of this disclosure, in routing leads to or from the touch sensor conductors, care needs to be taken to ensure that the routing does not cause interference with the sensor signal (e.g., with the sensed response).

In the illustrated embodiment, the non-crossing touch sensor conductors 302, 308 are parallel to each other, while the crossing touch sensor conductors 304, 306 are not. Through this configuration, and provided that the drive lines have orthogonal signals, the relationship between the non-crossing touch sensor conductors 302, 308 and the crossing touch sensor conductors 304, 306 changes along the length of the slide sensor 300. As discussed above, the signals can be orthogonal in time, frequency and/or code. In an embodiment, again employing orthogonal signals on multiple drive lines, the touch sensor conductors 302, 304, 306, 308 are oriented such that any given linear position along the length of the slide sensor 300 corresponds to a unique distance between each drive line and each sense line. In an embodiment, again employing orthogonal signals on multiple drive lines, the touch sensor conductors 302, 304, 306, 308 are oriented such that any given linear position along the length of the slide sensor 300 corresponds to a unique touch delta between each drive line and each sense line.

In an embodiment, the two drive lines are stimulated at separate times. In an embodiment, the two drive lines are stimulated at alternating times so that when one of the drive lines is being stimulated, the other is not, and vice versa. This permits the drive lines to use the same stimulation signal.

Although the non-crossing touch sensor conductors 302, 304 are shown as a straight line parallel to the lengthwise direction of the slide sensor 300, this orientation is not necessary or required. In an embodiment, one or more of the non-crossing touch sensor conductors 302, 304 are not straight. In an embodiment, touch sensor conductor one or more of the non-crossing touch sensor conductors 302, 304 are curved.

In an embodiment, only one of the non-crossing touch sensor conductors is required. In other words, in an embodiment, a slide sensor 300, operates with three touch sensor conductors 302, 304, 306. In an embodiment, only one of the crossing touch sensor conductors is required. In other words, in an embodiment, a slide sensor 300, operates with three touch sensor conductors 302, 304, 308. A three-touch sensor conductor slide sensor 300 may use one or two drive lines, and one or two sense lines.

Thus, as one of many examples of such a three-touch sensor conductor slide sensor 300, non-crossing touch sensor conductor 302 is used as a drive line, and crossing touch sensor conductors 304, 306 are used as sense lines. Distance between drive line and each sense line is inversely affected by movement up and down the sliding sensor 300. In such an embodiment, coupling between drive line and each sense line may be inversely affected by movement up and down the sliding sensor 300, that is, that when the coupling between drive line 302 and sense line 304 increases (e.g., when a touch object is lower on the illustration and thus touch sensor conductors 302, 304 are close together), coupling between drive line 302 and sense line 306 decreases (e.g., when a touch object is lower on the illustration and touch sensor conductors 302, 306 are farther apart).

As another illustration of a three-touch sensor conductor slide sensor 300, non-crossing touch sensor conductor 302 is used as a sense line, and crossing touch sensor conductors 304, 306 are used as drive lines. In such an embodiment, for a touch object location towards the bottom of the sliding sensor 300 (as oriented in the illustration) a larger touch delta would be expected to be seen on the sense line 302 for the stimulation signal on drive line 304 as compared to the stimulation signal on drive line 306.

As a further illustration of a three-touch sensor conductor slide sensor 300, non-crossing touch sensor conductors 302, 308 are used as sense lines, and crossing touch sensor conductor 304 is used as a drive line. In such an embodiment, for a touch object location towards the bottom of the sliding sensor 300 a larger touch delta would be expected to be seen on the sense line 302 as compared to what is seen on sense line 308 for the stimulation signal on drive line 304.

In an embodiment, sensor 300 is implemented such that at least crossing touch sensor conductors 306, 306 are not on the same layer or are conductively isolated by a bridge; two sense lines 304, 306 are positioned straight vertical on the left and right, and two drive lines 304, 306 positioned on the diagonals. In such an embodiment wherein non-crossing touch sensor conductors 302, 308 are sense lines and crossing touch sensor conductors 304, 306 are drive lines, and wherein two touch sensor conductors 302, 304 are on one layer, while the other two touch sensor conductors 306, 308 are on another layer, a single-sided-drive sensor in the form of a slider is configured such that:
  (i) when touched at its top,
  1) the touch delta on sense line 302 is greater with respect to drive line 306, and lower with respect to drive line 304;
  2) the touch delta on sense line 308 is lower with respect to drive line 306, and greater with respect to drive line 304;
  (ii) when touched at its middle,
  1) the touch delta on sense line 302 is about the same with respect to drive line 306 and drive line 304;
  2) the touch delta on sense line 308 is about the same with respect to drive line 306 and drive line 304;
  (iii) when touched at the bottom,
  1) the touch delta on sense line 302 is lower with respect to drive line 306, and greater with respect to drive line 304;
  2) the touch delta on sense line 308 is greater with respect to drive line 306, and lower with respect to drive line 304;

This result can be accessed from a single edge. More generally, the absolute touch delta of the two sense lines 302, 308 can be used by touch detection logic to determine how close a touch is from the right and left, and the difference in the deltas can be used to determine where the touch is on the vertical axis from bottom to top.

Figure 4:
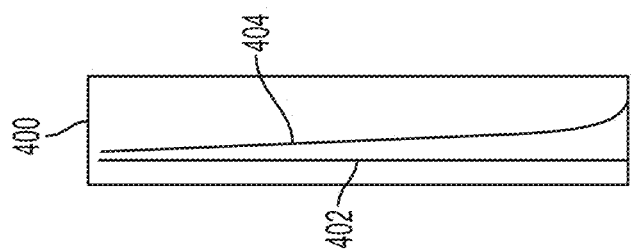
FIG. 4 shows a schematic illustration of yet another embodiment of a slide sensor.

FIG. 4 shows a schematic illustration of yet another embodiment of a two-touch sensor conductor 402, 404 slide sensor 400. The embodiment illustrated in FIG. 4 is similar to the one illustrated in FIG. 2, however, one of the two touch sensor conductors 404 in slide sensor 400 is curved. In an embodiment, a second order curve may be used. In an embodiment, a curve may be imparted to one or more of the touch sensor conductors 402, 404. In an embodiment, one or more of the touch sensor conductors 402, 404 are curved to affect the touch delta that is sensed on the sense line by the sensing circuitry (not shown). In an embodiment, the effect of a touch object is generally reduced with the square of the distance between the capacitively coupled touch sensor conductors. Thus, configuring touch sensor conductors such that their spacing is (or approximates) a second order curve may provide a more linear touch delta response as a touch object is moved along the length of the slide sensor 400. In an embodiment, one or more of the touch sensor conductors are curved so that the sensed signals are more linearly related to the position of touch. In an embodiment, one or more of the touch sensor conductors are curved to cause sensed signals to be linearly related to the position of touch.

Figure 5:
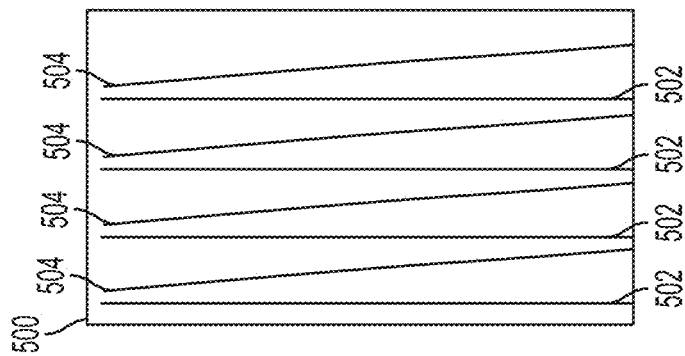
FIG. 5 shows a schematic illustration of one embodiment of a sensor for detecting touch.

Slide sensors 100, 200, 300 and 400 can be used in a horizontal series to provide X positioning. Turning to FIG. 5 an embodiment of a sensor for detecting touch is schematically illustrated. The senor 500 comprises two groups of touch sensor conductors 502, 504. The two groups of touch sensor conductors 502, 504 are shown as straight lines, but as discussed above, may be curved, and indeed, may be curved to increase the linearity of response (e.g., touch delta) with respect to a drive line/sense line pair. In an embodiment, one of the two groups of touch sensor conductors 502, 504 is employed as drive lines, while the other group of touch sensor conductors 502, 504 is employed as sense lines.

In an embodiment, the vertical/diagonal pairs of touch sensor conductors shown in FIG. 5 may be configured, and behave, as described in connection with FIG. 2. In an embodiment, the vertical/diagonal/vertical triplets of touch sensor conductors shown in FIG. 5 may be configured, and behave, as described in connection with a three-touch sensor conductor embodiment described in connection with FIG. 3. It should be noted that the embodiment shown in FIG. 5 arbitrarily contains an even number of touch sensor conductors, but could equally well have an odd number of touch sensor conductors, e.g., having an additional vertical touch sensor conductor to the right of the last touch sensor conductor shown.

The configuration shown in FIG. 5, and variations on that configuration that will be apparent to one of skill in the art in view of this disclosure, can be used to sense both X and Y position across the touch sensor 500. In an embodiment, the spacing between the drive lines in sensors according to the present disclosure may, but need not, fall within the range of 4 mm to 5 mm. In an embodiment, the spacing between the drive lines in sensors according to the present disclosure may be closer than 4 mm. In an embodiment, the spacing between the drive lines in sensors according to the present disclosure may exceed 5 mm. Similarly, in an embodiment, the spacing between the sense lines in sensors according to the present disclosure may, but need not, fall within the range of 4 mm to 5 mm. In an embodiment, the spacing between the sense lines in sensors according to the present disclosure may be closer than 4 mm. In an embodiment, the spacing between the sense lines in sensors according to the present disclosure may exceed 5 mm.

Touch location in the vertical ("Y") direction (as shown in the illustration) are identified as discussed above. Touch location in the horizontal ("X") direction is detected as a horizontal shift occurs in a touch object. Consider, for example a finger proximate to the touch sensor 500 in the upper left corner, and moving horizontally toward the upper right corner: when in the upper left corner a given magnitude touch delta will be seen between the first pair of drive and sense lines (e.g., the leftmost illustrated conductor and the second-to-left illustrated conductor); as the finger moves to the right, the magnitude of that touch delta will decrease, as the magnitude of the touch delta on the next pair of drive and sense lines increases (e.g., between the third-to-left conductor and the fourth-from-the-left illustrated conductor). This will continue across the panel. The foregoing analysis ignores the additional information that can be gleaned from the interaction between the second and third conductors, and the fourth and fifth conductors. In an embodiment, these touch deltas would be weaker near the top of the panel, but nonetheless, can provide valuable information to be used in locating the touch object. In an embodiment, where drive lines are driven with orthogonal signals and sense circuitry can sense an amount of each orthogonal signal that is present on each sense line, it will be apparent to a person of skill in the art in view of this disclosure that the sensed information from touch sensor 500 is sufficient to compute an X and a Y location for a touch object despite the lack of any nodes (i.e., crossing points between drive lines and sense lines).

The configuration shown in FIG. 5, and variations on that configuration that will be apparent to one of skill in the art in view of this disclosure, can be provided with all of the connections to drive and sense circuitry on one edge, thus permitting use in designs with edge constraints on at least three sides. As will be discussed in more detail below, care must be taken to shield the off-touch sensor drive lines from the off-touch sensor sense lines so that one does not affect the other. In an embodiment, the connections for one group of touch sensor conductors 502 are provided on one edge, while the connections for the other group of touch sensor conductors 504 are provided on the other edge. Such a configuration may reduce or eliminate shielding requirements. Moreover, in an embodiment, such a configuration may be used to keep stimulating circuits physically separate from sensing circuits.

FIG. 6 show a schematic illustration of another embodiment of a sensor for detecting touch. Sensor 600, like sensor 500, comprises two groups of touch sensor conductors 602, 604, like 502, 504. The embodiment illustrated in FIG. 6 differs from the FIG. 5 embodiment in that it additional contains a third group of touch sensor conductors 606. In an embodiment, crossing conductors 604, 606 of sensor 600 are on separate layers (which may be on opposite sides of, or on and/or within the same substrate, or which may be on and/or within two separate substrates). In an embodiment (see FIG. 8), crossing conductors 804, 806 of sensor 800 are on the same layer, but separated by a bridge. (In an embodiment, the crossing conductors 804, 806 are made from ITO (indium tin oxide) and ITO bridges are used to separate the crossing conductors 804, 806 where they cross.

Turning back to FIG. 6, at least one of the three groups of touch sensor conductors 602, 604, 608 must be used as drive lines, and at least one of the three groups of touch sensor conductors must be used as sense lines; the third group of touch sensor conductors in touch sensor 600 can be either drive or sense lines.

In an embodiment, both groups of crossing touch sensor conductors 804, 806 are employed as sense lines, and the group of non-crossing touch sensor conductors are employed as drive lines. In an embodiment, both groups of crossing touch sensor conductors 804, 806 are employed as drive lines, and the group of non-crossing touch sensor conductors are employed as sense lines. In an embodiment, one group of crossing touch sensor conductors 804 is employed as sense lines, and the group of non-crossing touch sensor conductors and the other group of crossing touch sensor conductor are employed as drive lines. In an embodiment, one group of crossing touch sensor conductors 804 is employed as drive lines, and the group of non-crossing touch sensor conductors and the other group of crossing touch sensor conductor are employed as sense lines. Regardless of the selection of drive and sense lines, the techniques as described above can resolve X and Y coordinates of a touch object. In an embodiment, the sense circuitry receives sufficient information from the sense lines to resolve X and Y coordinates of multiple touch objects.

In an embodiment, the allocation of drive line and sense line is dynamic, and changes over time. Thus, for example, referring to the three groups of touch sensor conductors as A, B and C, and using the "prime" designation (e.g., A') to show the drive lines, in an embodiment, for a first scan or frame, the groups are A', B C, for a second scan or frame, the groups are A, B', C, and for a third scan or frame, the groups are A, B, C'—in an embodiment, this sequence is repeated. In another embodiment, for a first scan or frame, the groups are A', B' C, for a second scan or frame, the groups are A, B', C', and for a third scan or frame, the groups are A', B, C'. Again, in an embodiment, the sequence is repeated.

The configuration shown in FIG. 6, and variations on that configuration that will be apparent to one of skill in the art in view of this disclosure, can be provided with all of the connections to drive and sense circuitry on one edge, thus permitting use in designs with edge constraints on at least three sides. As will be discussed in more detail below, care must be taken to shield the off-touch sensor drive lines from the off-touch sensor sense lines so that one does not affect the other. In an embodiment, the connections for one or two groups of touch sensor conductors are provided on one edge, while the connections for the other one or two groups of touch sensor conductors are provided on the other edge. In an embodiment, touch sensor conductors used as drive lines share a common edge for connection, and touch sensor conductors used as sense lines share a common edge for connection. In an embodiment, the common edge used for drive lines and the common edge used by sense lines are different edges. In an embodiment, the common edge used for drive lines and the common edge used by sense lines are opposite edges. Such a configuration may reduce or eliminate shielding requirements. Moreover, in an embodiment, such a configuration may be used to keep stimulating circuits physically separate from sensing circuits.

FIG. 7A shows an example of a connector 700 (portions made see-thru for illustrative purposes) that may be employed in connection with, e.g., the sensor 600 for detecting touch illustrated in FIG. 6. FIG. 7B shows the connector 700 and the leads 702 and terminals 704 on one side of the connector, while FIG. 7C shows connector 700 and the leads 706 and terminals 708 on the other side of the connector. The leads 706 and connections 708 seen in FIG. 7C are shown in phantom in FIG. 7A. In an embodiment, connector 700 is used in combination with the sensor 600. In an embodiment, leads 702 connect to the non-crossing touch sensor conductors 602, and leads 706 connect to the crossing touch sensor conductors 604, 606. Connector 700 is suitable for use as part of a connection between the touch sensor conductors 602, 604, 606 of the sensor 600 and drive and sense circuitry, and because the leads 702 are situated to connect to touch sensor conductors 602 and the leads 706 are situated to connect to touch sensor conductors 604, 606, connector 700 is particularly suited for an embodiment where: (i) non-crossing touch sensor conductors 602 are drive lines and the crossing touch sensor conductors 604, 608 are sense lines; or (ii) non-crossing touch sensor conductors 602 are sense lines and the crossing touch sensor conductors 604, 608 are drive lines. Grounding 710 separates the front and back of the connector to mitigate mixing or interference between signals on leads 702 and signals on leads 706.

When connector 700 is used in combination with the sensor 600, the connector 700 routes an electrical connection from non-crossing touch sensor conductors 602 to terminals 704, and an electrical connection from crossing touch sensor conductors 604, 606 to terminals 708. In an embodiment, the terminals 704, 708 provide an edge connector for easy plug-in operation. In an embodiment, drive circuitry and sense circuitry are available on an edge connection (not shown) that mates with the connector 700.

FIG. 9 provides a functional block diagram of an illustrative frequency division modulated touch detector. Sensor 600 (see FIG. 6) is shown schematically. In an embodiment, stimulation signals are transmitted to drive lines 702 of the touch sensor 230 via drive circuitry including digital-to-analog converters (DAC) 236, 238 and time domain received signals are sampled from the sense lines 706 by sense circuitry comprising analog-to-digital converters (ADC) 244, 246. In an embodiment, the transmitted signals are time domain signals generated by signal generators 248, 250 which are operatively connected to the DAC 236, 238. In an embodiment, a Signal Generator Register Interface block 224 operatively connected to the System Scheduler 222, is responsible for initiating transmission of the time domain signals based on a schedule. In an embodiment, Signal Generator Register Interface block 224 communicates with Frame-Phase Sync block 226, which causes Peak to Average Filter block 228 to feed Signal Generator blocks 248, 250 with data necessary to cause the signal generation.

In an embodiment, changes in the received signals are reflective of touch events at the touch sensor 600 (e.g., touch delta), noise and/or other influences. In an embodiment, the time domain received signals are queued in hard gates 252, before they are converted into the frequency domain by FFT block 254. In an embodiment, a Coding Gain Modulator/Demodulator block 268 provides bidirectional communications between the Signal Generator blocks 248, 250 and hard gates 252. In an embodiment, a temporal filter block 256 and level automatic gain control (AGC) block 258 are applied to the FFT block 254 output. In an embodiment, the AGC block 258 output is used to prove heat map data and is fed to UpSample block 260. In an embodiment, UpSample block 260 interpolates the heat map to produce a larger map in an effort to improve accuracy of Blob Detection block 262. In an embodiment, up sampling can be performed using a bi-linear interpolation. In an embodiment, Blob Detection block 262 performs post-processing to differentiate targets of interest. In an embodiment, Blob Detection block 262 output is sent to Touch Tracking block 264 to track targets of interest as they appear in consecutive or proximal frames.

In an embodiment, Blob Detection block 262 output components can also be sent to a multi-chip interface 266 for multi-chip implementations. In an embodiment, from the Touch Tracking block 264, results are sent to the Touch Data Physical Interface block 270 for short distance communication via QSPI/SPI.

In an embodiment, there is one DAC per channel. In an embodiment, each DAC has a signal emitter that emits a signal induced by the signal generator. In an embodiment, the signal emitter is driven by analog. In an embodiment, the signal emitter can be a common emitter. In an embodiment, signals are emitted by a signal generator, scheduled by the system scheduler, providing a list of digital values to the DAC. Each time the list of digital values is restarted, the emitted signal has the same initial phase.

In an embodiment, the frequency division modulated touch detector (absent the touchpad sensor) is implemented in a single integrated circuit. In an embodiment, the integrated circuit would have a plurality of ADC inputs and a plurality of DAC outputs. In an embodiment, the integrated circuit would have 36 ADC inputs and 64 orthogonal DAC outputs. In an embodiment, the integrated circuit is designed to cascade with one or more identical integrated circuits, providing additional signal space, such as 128, 192, 256 or more simultaneous orthogonal DAC outputs. In an embodiment, the ADC inputs are capable of determining a value for each of the DAC outputs within the signal space of the orthogonal DAC outputs, and thus, can determine values for DAC outputs from cascaded ICs as well as DAC outputs on the IC where the ADC resides.

In an embodiment such as that shown in FIG. 9, because the touch detection logic is now looking, for example, for 4 bins present per receiver, the beat Vpp is fairly manageable, and the overall baseline signal in the FFT increases very substantially. Furthermore, the overall sensor can run at a much higher baseline signal per transmitter than previous sensors.

Because the touch detection logic is looking for a differential signal, it may be possible in a particular application to provide some common mode rejection, perhaps eliminating the effect of some common mode noise sources. The effectiveness of such common mode rejection for a particular application depends at least in part upon how noise effects the FFT magnitudes.

Curves and Toroidal Shapes

Figure 10A:
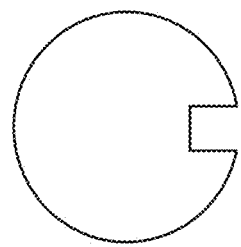
FIG. 10A is an illustration of a cross section of partial toroid.
Figure 10B:
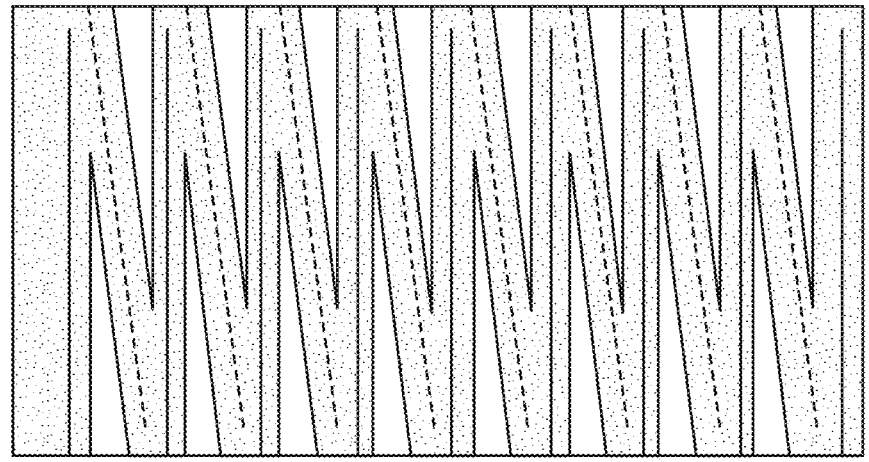
FIG. 10B is an illustration of one embodiment of a sensor that may be used in conjunction with a partial toroid such as the one shown in FIG. 10A.

FIG. 10A shows is an illustration of a cross section of partial toroid as may be commonly found in a steering device. FIG. 10B is an illustration of one embodiment of portions of a sensor that may be used in conjunction with a partial toroid such as the one shown in FIG. 10A. In an embodiment, two sets of conductors are interleaved, one set terminating at one end and the other set terminating at the other end, so that each conductor within a set can be routed to a transmitter or receiver at the same end as the other conductors in the set. In an embodiment, the two sets of conductors are interleaved on a flexible substrate, one set terminating at or near one edge of the substrate, and the other set terminating at or near an opposing edge of the substrate. In an embodiment, at least one set of conductors are operatively connected to transmitters adapted to transmit unique, orthogonal signals thereon. In an embodiment, both sets of conductors are operatively connected to transmitters adapted to transmit unique, orthogonal signals thereon. In an embodiment, at least one set of conductors are operatively connected to receivers adapted to receive signals thereon. In an embodiment, both sets of conductors are operatively connected to receivers adapted to receive signals thereon.

In the illustrated embodiment, the conductors of the first and second conductor sets are not parallel to each other, but rather, are arranged in a manner that the relationship between them changes along the vertical length as oriented in the drawing. In an embodiment, the first and second conductor sets are oriented such that any given linear position along the vertical length of the conductor (i.e., up and down on the illustrated figure) corresponds to a different distance between the conductors. In an embodiment the conductors are placed about the toroid or partial toroid. In an embodiment, the conductors are disposed upon a substrate that can be wrapped about the toroid or partial toroid. In an embodiment, the conductors are disposed upon a substrate that is notched or otherwise designed to be wrapped about a toroid or partial toroid or other curved shape.

Figure 11A:
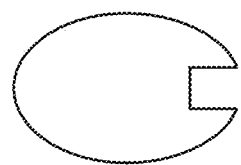
FIG. 11A is an illustration of a cross section of partial toroid that is more oval than the one shown in FIG. 10A.
Figure 11B:
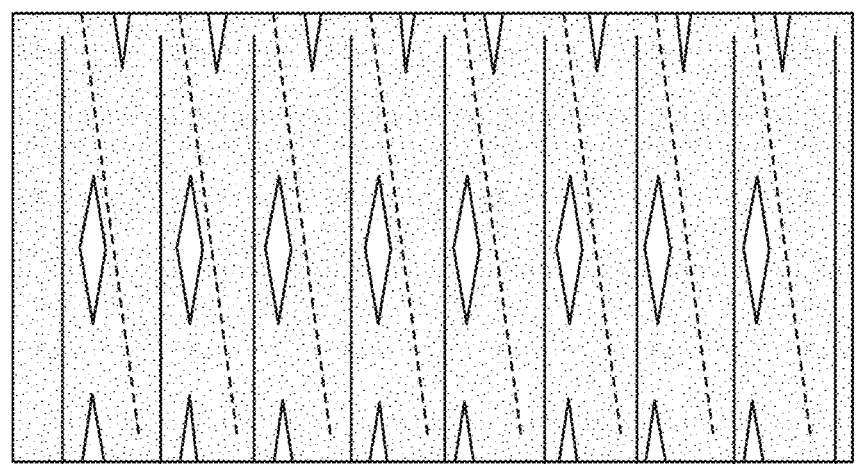
FIG. 11B is an illustration of one embodiment of a sensor that may be used in conjunction with a partial toroid such as the one shown in FIG. 11A.

In an embodiment, the sensor pattern of FIG. 10B and FIG. 11B may comprise additional diagonal conductors as generally shown in FIGS. 6 and 8. The additional diagonal conductors may be on a separate layer, or separate from the shown conductors with bridges as discussed above.

FIGS. 11A-11B show another embodiment of a cross section of a portion of a complex shape, and another pattern of two sets of conductors that may be wrapped about the complex shape.

In an embodiment, one set of conductors may operate as transmitters and the other set as receivers. In an embodiment, both sets of conductors may be both transmitters and receivers.

Figure 12D:
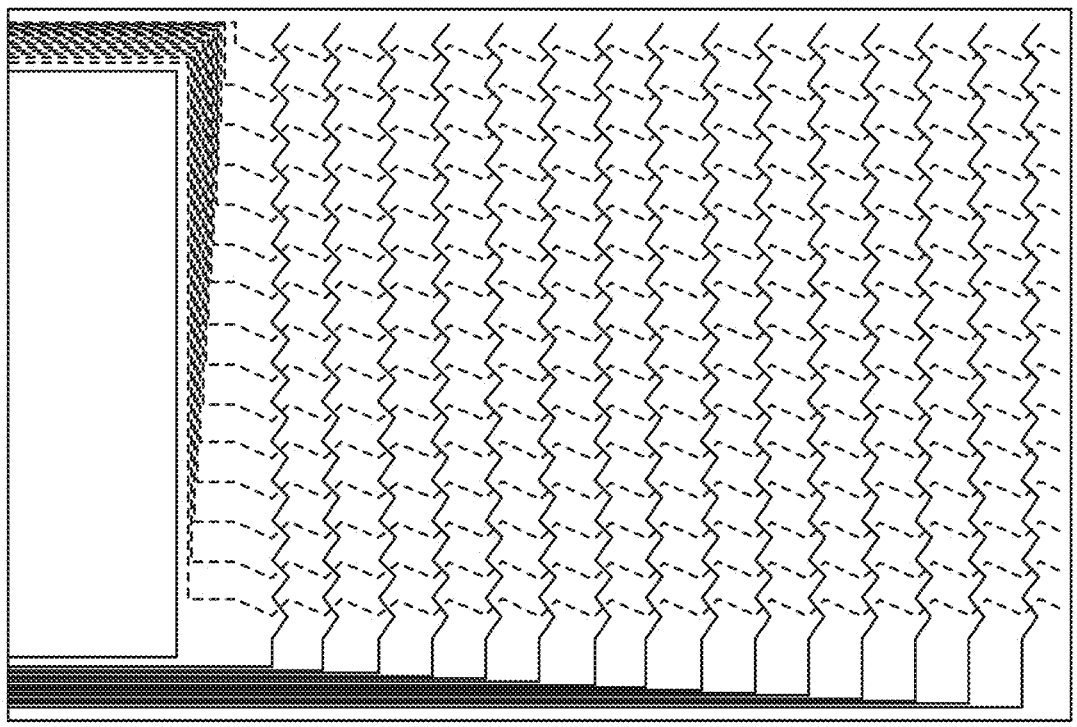

Turning briefly to FIGS. 12A-12E, illustrations are shown of various embodiments of a sensor pattern that may be advantageous for use in connection with portions of a complex shape such as a toroid. In FIG. 12A, as above, two sets of conductors are provided, which may be connected to transmitters, receivers or both. In an embodiment, one set of sensors (e.g., the set that are connected toward the bottom of the drawing, for example) are used as transmitters, and the other set used as receivers. Because each of the transmitter conductors cross only a limited number of receiver conductors, in an embodiment, frequencies can be reused. In the illustrated embodiment, none of one set of the sensors crosses more than three of the other set of sensors, and thus, only three unique, orthogonal signals are required to operate regardless of the total length of the sensor. In an embodiment, leads connecting the transmit conductors to a signal source can be common among transmit conductors using a common frequency. In an embodiment configured as illustrated, three separate leads would be required for all of the transmit conductors because the transmitters require only one from the signal generator to the transmit conductor per unique signal.

The illustration in FIG. 12A shows the sensor conductors crossing at approximately 120 degrees. In an embodiment, the sensor conductors from the two sets cross each other at an angle of 90 degrees. In an embodiment, the sensor conductors from one set cross the sensor conductors from another set at an angle differing from 120 degrees that causes each sensor conductor from one set to cross more sensors from the other set. In an embodiment, the sensor conductors from one set cross the sensor conductors from another set at an angle differing from 120 degrees that causes each sensor conductor from one set to cross fewer sensors from the other set. In an embodiment, the sensor conductors from the two sets cross each other at an angle less than 45 degrees. In an embodiment, the sensor conductors from the two sets cross each other at an angle greater than 135 degrees.

FIG. 12B shows another embodiment of a sensor pattern that may be advantageous for use in connection with portions of a complex shape such as a toroid. In an embodiment, one set of the conductors runs generally parallel to each other, while the other set of sensors runs at an angle to, and crosses each of the conductors in the first set, and each are attached to leads as shown at the top of the drawing. In FIG. 12A, one set of the conductors runs generally parallel to each other, while the other set of sensors runs at a 90 degree angle to, and crosses each of the conductors in the first set, and each of them are attached to leads. In an embodiment, one set of sensors is attached via leads to a receiver that can receive signals present on the conductors. In an embodiment, one set of sensors is attached via leads to a signal source that can transmit signals on the conductors. In an embodiment, both sets of sensors are attached via leads to a receiver that can receive signals present on the conductors. In an embodiment, at least one of the sets of sensors are attached via leads to a receiver that can receive signals present on the conductors and at least one of the sets of sensors are attached vial leads to a signal source that can transmit signals on the conductors. In an embodiment, both sets of sensors are attached via leads to a receiver that can receive signals present on the conductors and to a signal source that can transmit signals on the conductors.

In an embodiment, sensor patterns may be disposed on a flexible substrate that can be stretched to accommodate the size and shape of the curved surface, e.g., steering wheel, on which it is wrapped. Because the conductors may lack expandability (e.g., or stretchability) sufficient to permit the flexible substrate to be stretched around such a curve, in an embodiment, excess conductor may be placed on the substrate. As shown in FIG. 12C, the horizontally arranged conductors are placed on a substrate in a zig-zag pattern to facilitate expansion in the horizontal dimension. The zig-zag pattern is not required, and any of wide variety of patterns that may be used that permit expansion in the horizontal direction (e.g., wave-like patterns). Moreover, flexibility may be achieved in both the horizontal and vertical direction by applying patterns that can permit expansion (e.g., zig-zag, waves, etc.).

Figure 12E:
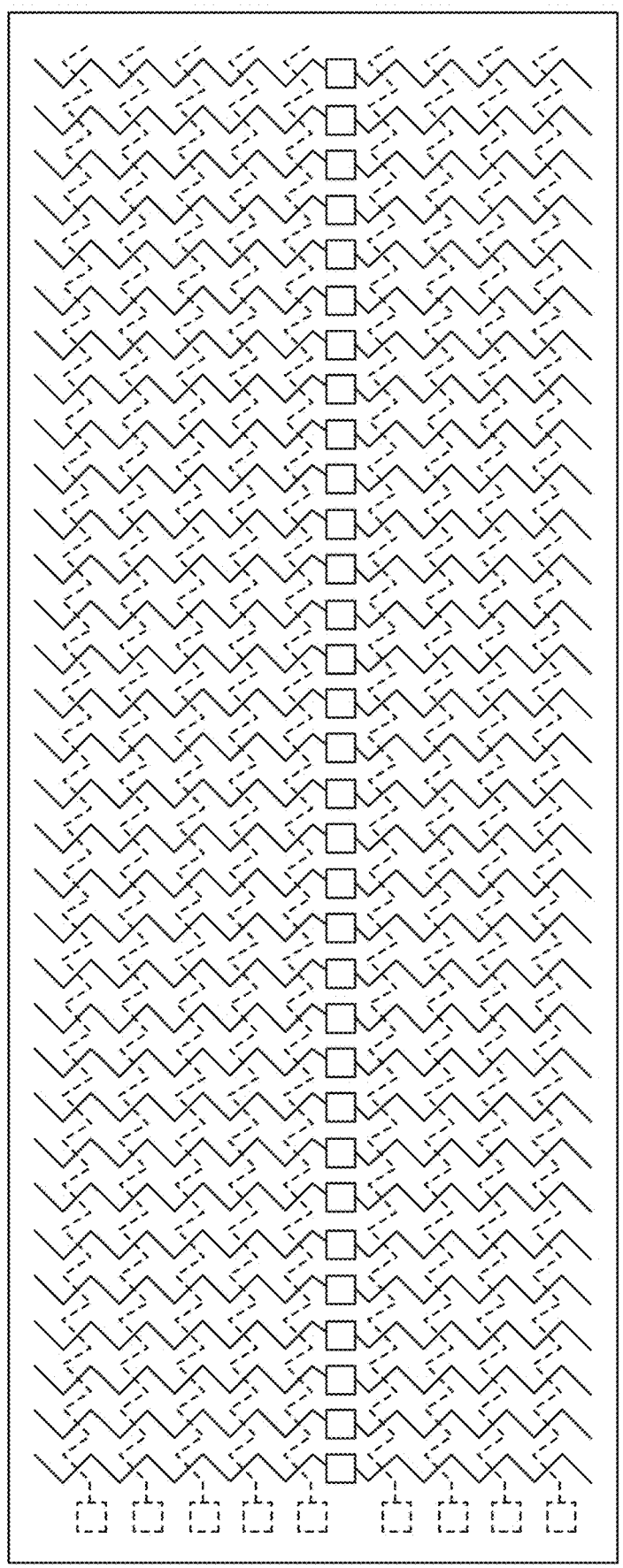

FIGS. 12D and 12E show sensor patterns that are expandable along both X and Y directions. In FIG. 12D, leads attachments are accommodated at edges of the substrate, while in FIG. 12E, one set of leads can be attached at an edge, while the other set can be attached, for example, in a channel or other central area of a shape on which the sensor pattern is used.

In an embodiment, conductors can be placed upon, or embedded in a flexible substrate (which could be made from a non-conductive fabric, plastic or elastomeric material). In an embodiment, a conductive thread is placed on or stitched into a flexible material (e.g., fabric) in a manner that permits a desired expansion (e.g., zig-zag, waves, etc.) in one or more desired dimensions. In an embodiment, a flexible substrate or fabric has crossing zig-zag patterns (or e.g., crossing sin wave patterns).

In an embodiment, a two-dimensional sensor pattern can be designed to accommodate expansion (in one or more directions) and then applied to a surface where the expansion occurs. In an embodiment, where the desired maximum amount of expansion (e.g., stretch) is known at sensor-pattern design time, such as when designing a sensor pattern for a known shape such as a steering wheel, a two-dimensional sensor pattern can be designed so that the pre-expanded sensor pattern accommodates the known or desired maximum expansion. In an embodiment, the two-dimensional sensor pattern is designed so as to be in its expanded and desired configuration once it is applied to the shape (e.g., steering wheel). In an embodiment, sensor patterns are designed in CAD systems on the three-dimensional objects, and may be "unfolded" into a two-dimensional pattern for fabrication using the facilities of the CAD program.

In an embodiment, the sensor patterns shown in FIGS. 12A-12E may be wrapped about a portion of a toroidal shaped object such as a steering wheel. In an embodiment, sensor patterns such as those shown in FIGS. 12A-12E are wrapped about portions of the steering wheel that are roughly equivalent to quadrants thereof. In an embodiment, sensor patterns are wrapped about the upper half of a steering wheel. In an embodiment, two separate sensor patterns similar to those in FIGS. 12A-12E are wrapped in left and right portions of the upper portion of a steering wheel.

Figure 13A:
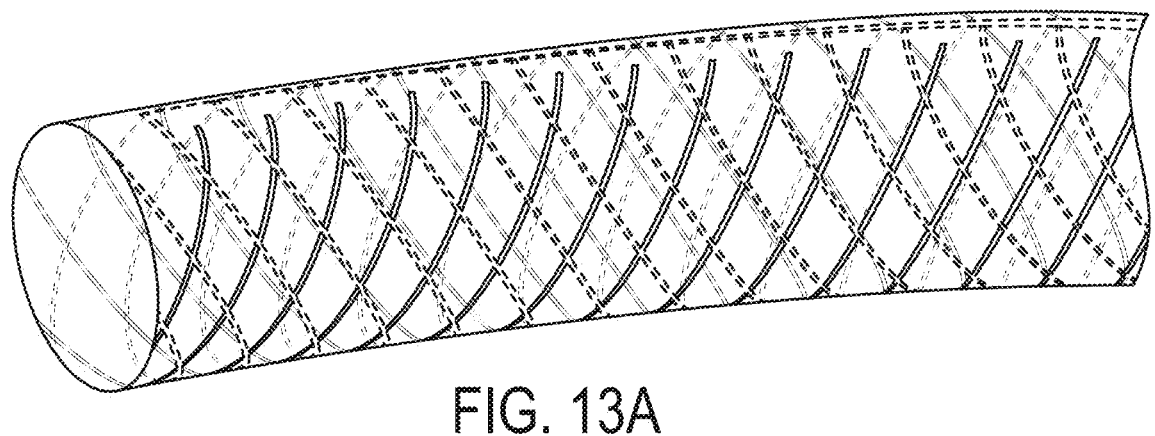
FIGS. 13A-13C shows several views of an embodiment of a crossing sensor pattern in a toroidal configuration.
Figure 13B:
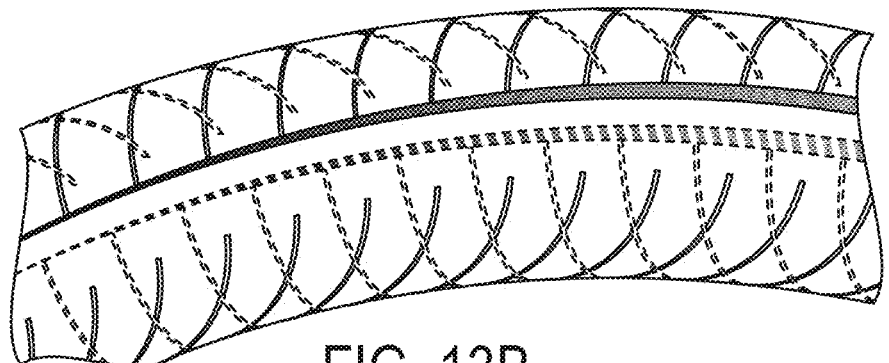
Figure 13C:
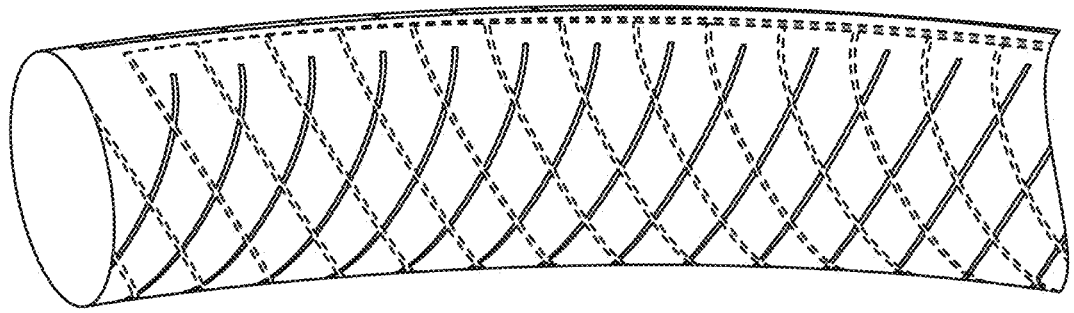
Figure 14A:
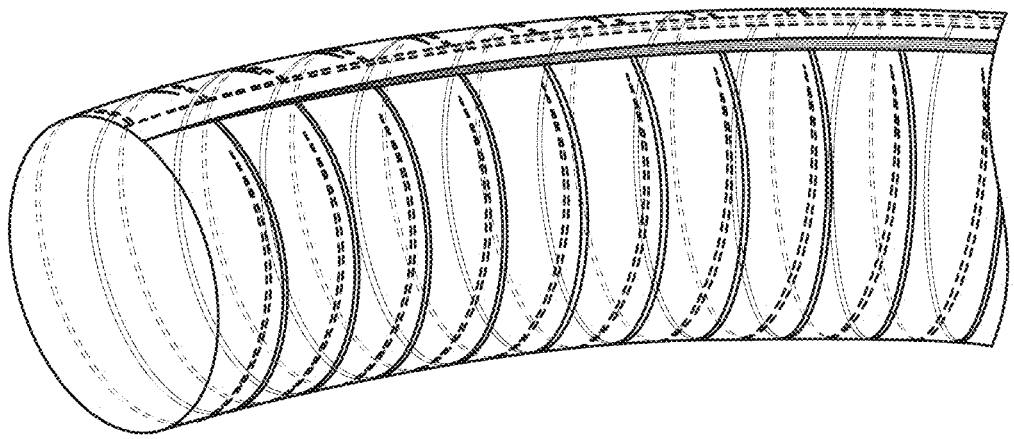
FIGS. 14A-14C shows several views of an embodiment of a non-crossing sensor pattern in a toroidal configuration.
Figure 14B:
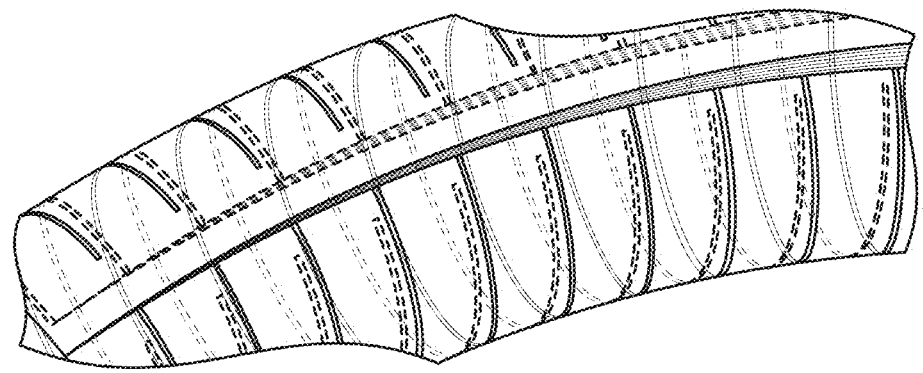
Figure 14C:
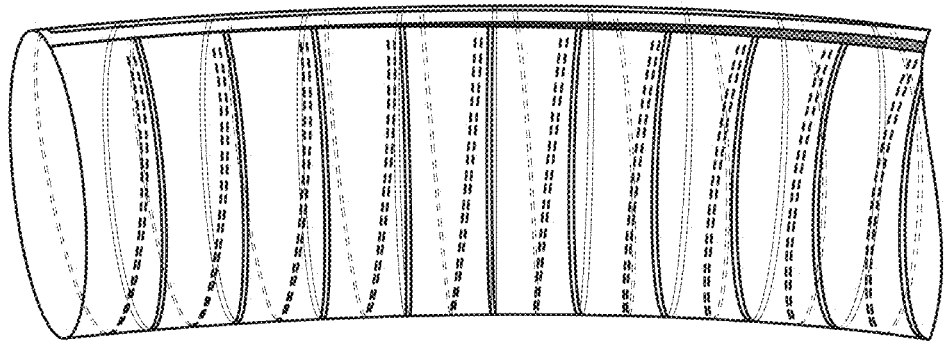
Figure 17A:
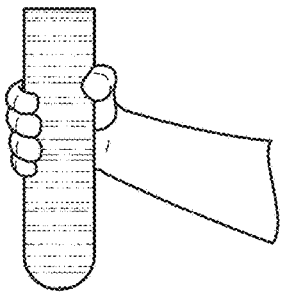
FIGS. 17A-17F is an illustration of a variety of hand poses with respect to an object such as a game controller.
Figure 17B:
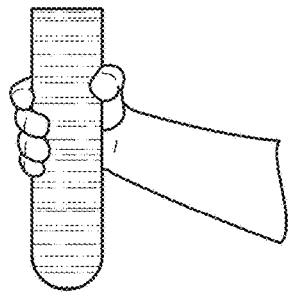
Figure 17C:
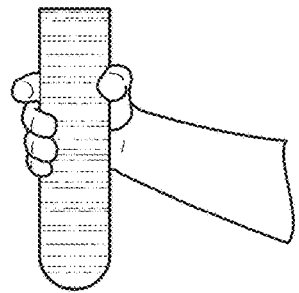
Figure 17D:
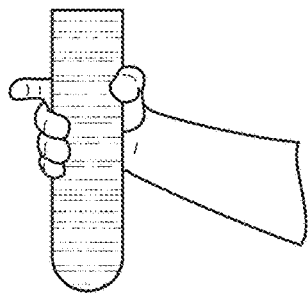
Figure 17E:
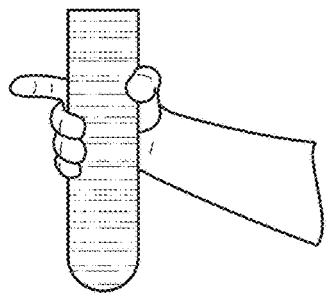
Figure 17F:
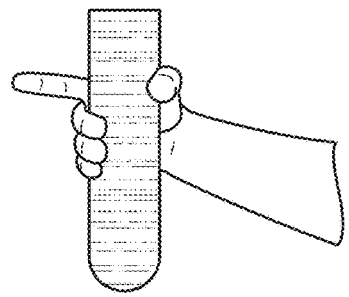

FIGS. 13A-13C shows three views of an embodiment of a crossing sensor pattern in a partial toroidal configuration. The leads from each conductor back to the transmitters or receivers can be seen best in FIG. 13B. FIGS. 14A-14C shows several views of an embodiment of a non-crossing sensor pattern in a toroidal configuration. The leads from each conductor back to the transmitters or receivers can be seen best in FIG. 14B.

Signal Infusion

This section relates to touch and in-air sensitive input devices, specifically input devices that sense the human hand on and/or above and/or near, the surface of the object. Signal injection (a/k/a signal infusion) can be used to enhance appendage detection and characterization. See, e.g., U.S. Provisional Patent Application No. 62/428,862 filed Dec. 1, 2016. The three-dimensional position, orientation and "curl" or "flex" of fingers on a hand holding a controller can be measured by infusing signals into the hand or other body party and measuring the contribution of each of these signals at various points on a controller (e.g., a handheld or hand operated controller). In an embodiment, infusion signals are measured at a sensor near the hand or as distance between the sensor and the hand changes. In an embodiment, the receive apparatus on the controller (i.e., the sensor) can be a capacitive sensor, especially a projected-capacitive sensor that uses simultaneous orthogonal signals.

Briefly turning to FIG. 15, in an embodiment, signals may be infused into the hand in a manner that the signal levels should be different for each finger due to the different amounts of flesh through which the signals must pass. In an embodiment, each injected signal will be present on each finger, but in different amounts. In an embodiment, to determine the position of each finger, it will be necessary to determine the amounts of each signal to determine where one or more fingers are touching, or where one or more fingers are hovering.

Briefly turning to FIG. 16, there is illustrated the use of a strap, lanyard or glove to inject the signals into the hand. The strap, lanyard or glove may be designed to be form-fit to the hand, or may be elastic. One or more signals are injected (i.e., infused) into the hand by electrodes that are in capacitive or ohmic contact with the hand. The strap, lanyard or glove may infuse the signals near the fingers, or farther away. It may infuse them on the back or front of the hand, or on the surface of some other part of the body. For example, a wrist-strap may be used to infuse signals at that point.

Briefly turning to FIGS. 17A-17F, illustrations of several hand poses are shown about an object to simulate grip on a generic version of a controller for a discussion concerning detecting the position and "curl" of a finger. In an embodiment, the index finger can be used as a trigger for the controller and thus, it may be desirable to determine its placement, how far it extends from the surface of the controller, and the angles of the finger joints. In an embodiment, because most sets of joint angles are unnatural positions (and so unlikely to occur), it may be sufficient to roughly determine position of the finger be able to deduce how the finger is positioned or curled.

Figure 18:
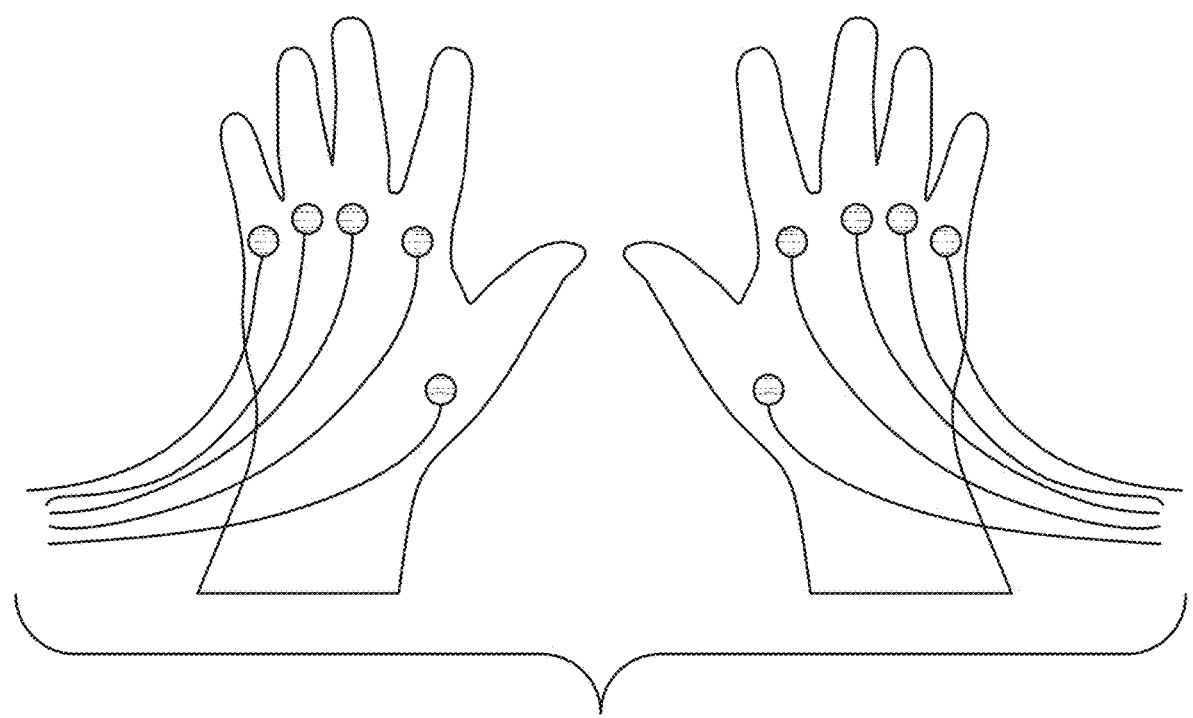
FIG. 18 is a schematic illustration of a bimanual variation of the embodiment of the signal injection system shown in FIG. 15.

Turning briefly to FIG. 18, a bimanual variation of the embodiment shown in FIG. 15 is shown. Signals are infused into both hands of a user at a variety of locations. In an embodiment, signals from one hand flow through the fingers of the other hand when the hands are in close contact to one another or touching. Contact between fingers of the same hand (e.g. an OK gesture) create a path from one signal injector to another on the same hand, and contact between fingers of both hands (e.g. touching index fingers together) creates a path between signal injectors on both hands. In the case of a multi-user system, contact between the hands of multiple users creates a number of pathways for signals to travel that can be interpreted as command gestures.

With a controller (e.g., a game controller) or other user interface device, it is desirable to be able to detect and characterize the location of the holding hand's fingers, even when they are not actually touching the device. In an embodiment, an index finger can be detected as a "trigger finger", and thus, an input device would sense its position and "curl", including the parts of the finger that are not in contact with a touch-detecting surface.

In an embodiment, a game controller's surface is a touch sensitive surface (e.g., a detector or touch screen) that can detect where on the surface the hand and fingers are touching. In an embodiment, the touch sensitive surface is a capacitive touch screen or other touch surface, and small changes in capacitance are used to detect when conductive or capacitive objects touch or are "hovering" nearby. As used in this context, the hovering means sufficiently close to the touch surface to cause a recognizable change, despite the fact that the conductive or capacitive object, e.g., a finger, is not in actual physical contact with the touch surface.

In an embodiment, an electrical signal is injected (a/k/a infused) into the hand or other part of the body, and this signal (as conducted by the body) can be detected by the capacitive touch detector in proximity to the body, even when the body (e.g., hands, fingers or other part of the body) are not in direct contact with the touch surface. In an embodiment, this detected signal allows a proximity of the hand or finger or other body part to be determined, relative to the touch surface. In an embodiment, this detected signal allows a proximity and orientation of the hand or finger or other body part to be determined, relative to the touch surface.

In an embodiment, the signal infusion described herein is deployed in connection with a capacitive touch detector that uses a plurality of simultaneously generated frequency orthogonal signals to detect touch and hover, including, without limitation, the touch sensitive surfaces illustrated in U.S. Pat. Nos. 9,019,224, 9,158,411 and 9,235,307, to name a few. In an embodiment, the infused signal is simultaneous with, and frequency orthogonal to, the plurality of simultaneously generated frequency orthogonal signals that are used to detect touch and hover. In an embodiment, each of a plurality of infusion signals are infused into the hand or finger at a location near the proximal knuckle (i.e., where the fingers join the hand). In an embodiment, one signal is infused proximate to a first finger, and another signal is injected proximate to another finger. In an embodiment, a plurality of unique, frequency orthogonal signals (which are both frequency orthogonal with the other infused signals and the signals used by the touch detector) are infused into the hand in a plurality of locations. In an embodiment, five unique, frequency orthogonal signals (which are both frequency orthogonal with the other infused signals and the signals used by the touch detector) are infused into the hand proximate to each finger (as used herein, the thumb being considered a finger).

The touch detector—which absent the infused signals is configured to measure and identify changes in the level of the frequency orthogonal signals that are received on receivers of the capacitive touch detector—is also configured to measure and identify changes in the level of the infused frequency orthogonal signals. Identification of the change in the infused frequency orthogonal signals, allows the proximity of the hand (or finger or some other body part) to be determined, relative to the touch surface. Orientation may also be determined from interpretation of the infusion signal as received by the touch sensor receivers.

In an embodiment, more than one electrical signal is infused into and conducted by the body, allowing the relative characteristics of these signals (as received by the touch detector) to be used to determine the relative proximity and orientation of the body or body parts to the touch surface. As an example, five infusion pads (e.g., electrodes) may be positioned proximate to the five knuckles where the fingers join to the hand, and ten unique, frequency orthogonal signals (frequency orthogonal with the other infused signals and the signals used by the touch detector) are infused into the hand, two via each of the five injector pads. In the example, each of the five injector pads conducts two separate signals to the hand. In an embodiment, each pair of signals are relatively distant frequencies from each other, e.g., one high and one low frequency in each pair, because higher and lower frequency signals have differing conduction characteristics across the body, and therefore differing detection characteristics at the touch sensor.

In an embodiment, the infusion signals are infused through a strap or lanyard that touches (or is in close proximity to) the user's hand, wrist or other body part. In an embodiment, one or more infusion pads or infusion electrodes are integrated into a strap or lanyard associated with the touch object including the touch surface. In an embodiment one or more infusion pads or electrodes are integrated into a wearable garment, e.g., a glove. In an embodiment, one or more infusion pads are integrated into an object in the physical environment, for example, but without limitation, a chair back, seat or arm, a table top, or a floor mat.

In an embodiment, the injected signals from the infusor's device (which may be a strap, lanyard, wearable or provided as an environmental source) are used to determine whether the infusor's device is being worn by or is in proper proximity to the user. In an embodiment, the injected signals from the infusor's device are used to determine whether a controller is being used without the benefit of the infusor's device.

In an embodiment, the "curl" of some or all of the fingers of the hand holding a controller can be determined by analyzing the relative characteristics of the injected signals as they are received by the touch detector. In an embodiment, these characteristics include the relative amplitudes and time offsets or phases of the received signals. In an embodiment, MIMO-like techniques (such as principal components analysis) are used to determine the relative contributions of infused signal received that are contributed by each finger. In an embodiment, a calibration step is performed and subsequent measurements are interpreted given the information in the calibration step. In an embodiment, the calibration step includes moving the fingers to specified positions while the contributions of the infusion signals are measured. In an embodiment, the calibration step includes performing a gesture or set of gestures with the fingers while the contributions of the infusion signals are measured.

In an embodiment, impedances are placed in series with the signal infusors to enhance the ability to distinguish the contributions of the infusion signals from what is received from each finger. In an embodiment, the impedances are resistances. In an embodiment, the impedances are capacitances. In an embodiment, the impedances are inductances. In an embodiment, the impedances are parallel and series combinations of resistors and/or capacitors and/or inductors. In an embodiment, the impedances are general and include resistance and reactance components that may vary according to frequency. In an embodiment, the impedances in series with the signal infusors have an impedance approximately the same as the impedance that would be experienced by the infused signal if it traversed the amount of human flesh equivalent to the distance between its infusion location and the bases of the other fingers. In an embodiment, signals infused into the fingers are used to sense contact between the fingers themselves. In an embodiment, the signal infusers are paired with signal receivers and the signals received by such signal receivers are used to sense finger-to-finger contact.

In many systems, bimanual input is desirable. In an embodiment, a user holds two controllers, one in each hand. The two controllers are configured to infuse one or more distinct infusion signals into each of the hands of the user as described above. In an embodiment, infused signals from one controller can be sensed by the other controller when the user's hands come into contact with or close proximity to one another. In an embodiment, the pair of controllers and signal injectors are used to sense contact between fingers of different hands.

In many systems, multi-user input is desirable. In an embodiment, two or more users work with independent controllers. In an embodiment, signals infused into the hands of one user can be detected by the controller of another user when intentional (e.g., a handshake, fist-bump, or high-five) or unintentional contact is made between users. In an embodiment, the type of contact between users (e.g., a handshake, fist-bump, high-five or an unintentional or incidental contact) may be distinguished by the signals infused into the hands of one user that are detected by the controller of another user. In an embodiment, signals infused into the hands of one user can be detected by signal receivers that are proximate to signal infusors of another user when contact (intentional or unintentional) is made. In an embodiment, the type of contact between users (e.g., a handshake, fist-bump, high-five or an unintentional or incidental contact) may be distinguished by the signals infused into the hands of one user that are detected by signal receivers that are proximate to signal infusors of another user.

In an embodiment, signals infused into the fingers of a user can be sensed by multiple controllers, but it is not necessary for such controllers to be associated with one or more signal infusors. In other words, as an example embodiment, two users may each use a wearable strap-based signal infusor (which may look like, e.g., a watch), each of the wearable strap-based infusors having their own frequency orthogonal signals—and each user may use one or more of a plurality of touch objects that can detect the frequency orthogonal signals of each of the wearables.

In various embodiments, the controller/user-interface device may be one or more of the following—a handheld controller, a bimanual handheld controller, a VR headset, an AR headset, a keyboard, a mouse, a joystick, ear-phones, a watch, a capacitive touch sensitive mobile phone, a capacitive touch sensitive tablet, a touchpad, including a hover sensitive touchpad (e.g., as described in U.S. patent application Ser. No. 15/224,266), a touch keyboard (e.g., as described in U.S. patent application Ser. No. 15/200,642), or other touch sensitive objects (e.g., as described in U.S. patent application Ser. No. 15/251,859).

Other body parts and appendages can be measured as well, such as ears, nose, mouth, jaw, feet, toes, elbows, knees, chest, genitals, buttocks, etc. In an embodiment, a plurality of injector or infusor pads or electrodes are distributed among the body, each of the pads or electrodes infusing one or more signals that are unique and frequency orthogonal with respect to the others, and with those used by a sensing device with which interaction is desired or intended.

Isolating Infusion Signals to Different Body Areas

Normally an electrical signal that is infused into a human body travels to other parts of that body with relative ease. For the purpose of considering the propagation of infusion signals, the human body can be modeled as (i.e., thought of) as a plastic bag filled with salt water. The plastic bag can be thought of as representing less-conductive portions of the body, such as the skin, and the salt water representing the more conductive portions, such as blood and muscle tissue. At DC or very low frequencies, the body presents a very high electrical impedance to signals infused on its surface. However, at higher frequencies (e.g., around 10 kHz on up), the impedance starts to diminish because the body's surface acts as a capacitor and the signals can pass through it. Moreover, the "salt water" does not represent a substantial barrier for the signals. Therefore, at higher frequencies, the human body conducts quite well. At even higher frequencies, the "skin" effect takes over and forces electrical currents in the body to flow only near the surface. This increases the electrical impedance as seen by the signals because the amount of area the signals have to pass through (as seen in a cross-section of the conductor) is decreased as the signal frequency increases. The "skin effect" becomes more significant, and thus more important to consider, above about 10 MHz.

The difference in transmission of frequencies can be used to make an effective infusion system having two signal infusors operatively connected to a signal source. In an embodiment, each of the two signal infusors can be adapted for attachment to different parts of the same hand of a user. In an embodiment, the signal source is configured to transmit a one signal to the first signal infusor, and a different signal to the second signal infusor. In an embodiment, the signal to the first infusor may include a first high frequency signal above 20 KHz and a first low frequency signal above 10 KHz. In an embodiment, the first high frequency signal is at least one octave above the first low frequency signal. In an embodiment, the first high frequency signal is at least five octaves above the first low frequency signal. In an embodiment, the first high frequency signal is at least ten octaves above the first low frequency signal. In an embodiment, the signal to the second infusor may include a second high frequency signal above 20 KHz and a second low frequency signal above 10 KHz. In an embodiment, the second high frequency signal is at least one octave above the second low frequency signal. In an embodiment, the second high frequency signal is at least five octaves above the second low frequency signal. In an embodiment, the second high frequency signal is at least ten octaves above the second low frequency signal.

In an embodiment, an infused signal can be isolated to a particular portion of the body (e.g., a single finger). In this context, the term isolated refers to mitigating the signal and/or its effects beyond the portion of the body where it is "isolated." In an embodiment, a conductor is placed on (or in) the body and the conductor's electrical potential is set to be an alternating current (AC) ground. In an embodiment, a metal band is placed on the surface of the body, between the two portions it is desired to isolate, and it is set to an AC ground. In an embodiment, a piece of metal foil is wrapped around a finger and set to an AC ground to isolate the finger. In an embodiment, a thin piece of metal foil is wrapped around a finger and set to an AC ground to isolate the finger.

In an embodiment, a common mode choke (or inductor) is placed around the body parts to be isolated from each other. In an embodiment, the common mode choke may be similar to the ferrite bead that is placed on the ends of computer cables to reduce common mode currents. In an embodiment, a common mode choke is a metal ring. In an embodiment, a common mode choke ring is made of iron, or a ferrous alloy (e.g., steel). In an embodiment, a common mode choke ring is made from a ferrite material. In an embodiment, the choke could be a solid ring. In an embodiment, the choke could be made in multiple pieces and the pieces would form a ring when placed around the body part in question. In an embodiment, the choke is placed around a finger.

In an embodiment, where two portions of the body are isolated from each other, a signal infused on one body portion is mitigated on the other. In an embodiment, where two portions of the body are isolated from each other, a different signal may be infused on each of the body portions, and each of the two different signals is mitigated on the other. In an embodiment, the isolation mechanism (e.g., choke) will substantially attenuate the isolated signal as measured on the other body part. In an embodiment, the isolation mechanism will substantially attenuate the signal which is not supposed to be in a particular portion of the body so that only the signal that is intended to be in that portion will be detected. In an embodiment, the isolation mechanism substantially attenuates the signal which is not supposed to be in a particular portion of the body and a receiver is sensitized to the signals so that only the signal that is intended to be in that portion will be detected. In an embodiment, the attenuation is only partial and the different body portions can be identified by analyzing the difference or ratio between the two signals. In an embodiment, multiple portions of the body can be isolation from each other in this manner.

Figure 19:
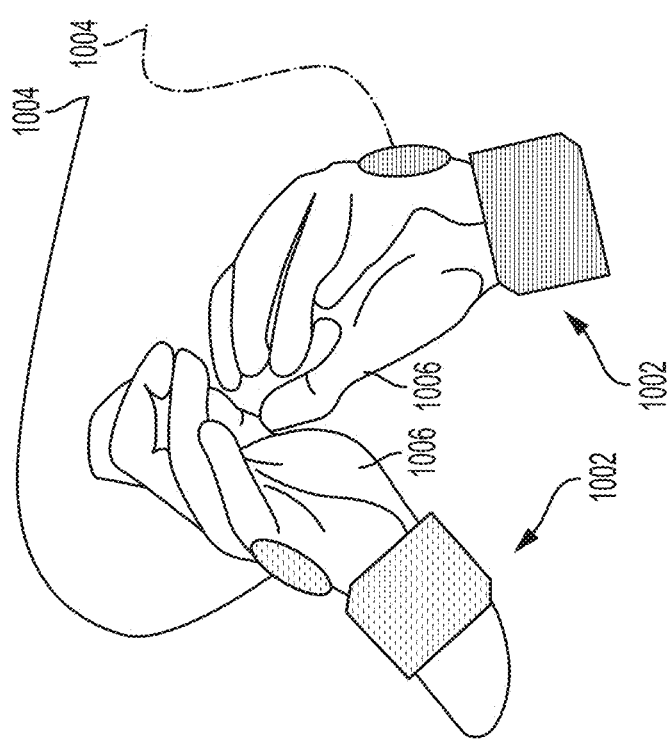
FIG. 19 is an illustration of a hand infusion and isolation system according to one embodiment of the present disclosure.

Turning briefly to FIG. 19, a left and right hand 1006 are shown. Leads and signal infusers 1004 are operatively connected to a signal generator (not shown) and to each of the left and right hands. Different signals are infused into the hands via the infusors. Signals Isolation bands 1002 are placed around the wrists to attenuate propagation of signals infused into the hands beyond the wrist. Thus, signals infused into each hand are isolated from the opposing hand. The differential in magnitude between the two signals on each hand allows a touch or hover receiver to distinguish between the hands on the basis of the quantity of each of the two signals.

In an embodiment, a first signal is infused into the left hand and a second signal is infused into the right hand; an isolator band is placed on each wrist to mitigate propagation of the infused signal beyond the hand in which it is infused. One of the right and left hand come into proximity with a receiver that is part of a sensor that can detect the infused signals (e.g., in a steering wheel as described above). The sensor is used to detect an amount of the first signal and an amount of the second signal in a received signal that is detected after a hand is in proximity to the receiver, and the sensor is configured to differentiate between the first hand and the second hand based on the amount of the first and second signal detected.

Figure 20:
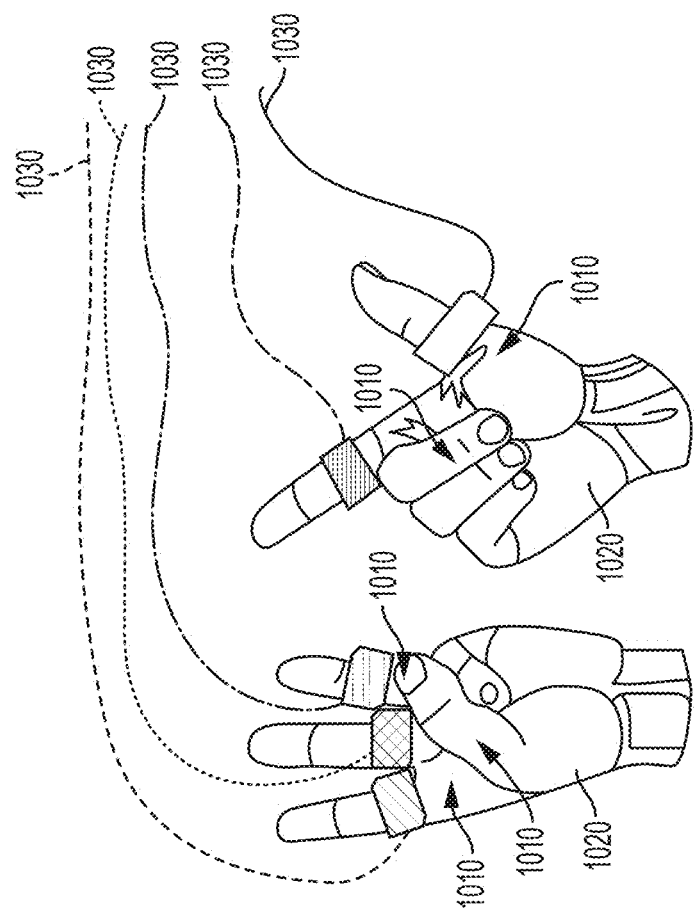
FIG. 20 is an illustration of a finger infusion and isolation system according to one embodiment of the present disclosure.

Turning to FIG. 20, a left and a right hand 1020 are shown. In an embodiment, combination isolators/infusors 1010 are deployed at the base of each of a plurality of fingers and connected to a signal source (not shown) via leads 1030. In an embodiment, isolators/infusors may be embedded in a glove, or one or several rings, or other wearable. The isolators/infusors 1010 at the base of the fingers attenuate the signal infused by that isolator/infusor 1010 from traveling into the hand and thus, the rest of the body. In an embodiment, the isolator/infusor 1010 attenuate the signal infused by that isolator/infusor 1010 from other isolators/infusors 1010 that they may contact. In an embodiment, different orthogonal signals are generated by a signal source and infused into each of the fingers via the isolators/infusors 1010.

In the illustrated embodiment, several fingers are isolated from each other and each infused with a different signal to make it distinguishable from the others. When one of the infused digits comes into proximity with a sensor that detects the infused signals (e.g., a game controller or steering wheel), the sensor can be used to detect an amount of each of the orthogonal signals in a signal received by a sensor receiver. Based on the quantity of each signal received, the sensor can then signal identify the isolator/infusor 1010 associated with the proximate digit.

Signal Types

This form of isolation discussed above is modulation agnostic and thus, should work for almost any signal type. The form of modulation will have little to no effect on the isolation or attenuation caused by the isolators. In an embodiment, the infused signals should be orthogonal to each other to allow a receiver to detect each individual signal from a linear combination of them. Signals that are orthogonal in frequency, code or time should work with this technique.

Note that some forms of isolators will be effective at different frequencies. For example, a choke isolator may more effective at higher frequencies than lower ones. Also for example, a ferrite material will have a frequency window over which it performs well depending on the characteristics of the particular material.

Applications

If different signals are infused into different portions of the body that are isolated from each other, at least partially, that will allow determination of which portion of the body is near a particular receiver. For example, isolating the left hand and the right hand from one-another may permit signals from a receiver touched by one or the other hand to be used to determine which hand touched the receiver. Similarly, isolating digits of a hand from one-another may permit signals from a receiver touched by one digit to determine which digit touched the receiver. In an embodiment, isolating digits of a hand from one-another may permit a game controller to determine which digit is in touch with a specific portion thereof.

Throughout this disclosure, the terms "touch," "touches," or other descriptors may be used to describe events or periods of time in which a user's finger, a stylus, an object or a body part is detected by a sensor. In some embodiments, these detections occur only when the user is in physical contact with a sensor, or a device in which it is embodied. In other embodiments, the sensor may be tuned to allow the detection of "touches" or "contacts" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors.

As used herein, ordinal words such as first and second when used to identify unnumbered objects are merely used to distinguish between those objects, and not intended to create an order of the objects or otherwise limit the objects they are used to identify.

As used herein, the term circumference has its ordinary meaning, that is: the enclosing boundary of a curved geometric figure, but it should be understood that the curved geometric figure is not limited to a circle.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

The invention claimed is:

1. An infusion system comprising:
   first and second signal infusors operatively connected to a signal source, each of the first and second signal infusors adapted for attachment to a first and second hand of a user;
   the signal source configured to transmit a first signal to the first signal infusor, and to transmit a second signal to the second signal infusor, the first and second signals being orthogonal with respect to each other; and
   first and second signal isolators adapted for attachment to a first and second wrist of a user.

2. An infusion system comprising:
   first and second signal infusors operatively connected to an infusion signal source, each of the first and second signal infusors adapted for attachment to different parts of the same hand of a user; and
   the infusion signal source configured to transmit a first signal to the first signal infusor, and to transmit a second signal to the second signal infusor, the first signal comprising a first high frequency signal above 20 KHz and a first low frequency signal above 10 KHz, the first high frequency signal being at least one octave above the first low frequency signal, and the second signal comprising a second high frequency signal above 20 KHz and a second low frequency signal above 10 KHz, the second high frequency signal being at least one octave above the second low frequency signal;

wherein the first signal and the second signal are orthogonal to one-another.

3. The infusion system of claim 2, further comprising:

a sensor comprising:

base having at least a portion thereof in the shape of a toroidal section;

a first plurality of conductors, each of the conductors in the first plurality of conductors wrapped in a first direction around at least a portion of the portion of the base, each of the conductors in the first plurality of conductors comprising a lead operatively connecting the conductor to one of a plurality of receivers;

a second plurality of conductors, each of the conductors in the second plurality of drive conductors wrapped in a direction opposite to the first direction around at least a portion of the portion of the base, each of the conductors in the second plurality of conductors comprising a lead operatively connecting the conductor to at least one selected from a group consisting of: a sensor signal source adapted to generate a plurality of orthogonal signals that are each orthogonal to each other of the orthogonal signals and to the first and second signals; and one of the plurality of receivers;

each of the first plurality of conductors and each of the second plurality of conductors being wrapped such that, for any two given points on any conductor of the first plurality of conductors, the nearest point to each such point on any conductor of the second plurality of conductors is a different distance away.

4. An infusion system comprising:

first and second signal infusors operatively connected to a signal source, the first and second signal infusors adapted for attachment to a user at first and second body portions, wherein the first and second signal infusors are adapted to transmit signals into the first and second body portions of the user;

the signal source configured to transmit to the first signal infusor a first signal that is frequency orthogonal to a second signal transmitted to the second signal infusor; and at least one isolator adapted for attachment to the user, wherein the at least one isolator is adapted to mitigate propagation of the first signal transmitted into the first body portion to the second body portion.

* * * * *